United States Patent [19]
Duffy et al.

[11] Patent Number: 5,221,170
[45] Date of Patent: Jun. 22, 1993

[54] COATED THREADED FASTENERS

[75] Inventors: Richard J. Duffy, Utica; Joseph R. Dudley, Southfield; Gregory A. Fruehe, Kalamazoo; Max F. Dorflinger, Washington, all of Mich.

[73] Assignee: Nylok Fastener Corporation, Rochester, Mich.

[21] Appl. No.: 716,761

[22] Filed: Jun. 18, 1991

Related U.S. Application Data

[63] Continuation of Ser. No. 281,633, Dec. 9, 1988, abandoned, which is a continuation-in-part of Ser. No. 907,582, Sep. 15, 1986, Pat. No. 4,775,555, and a continuation-in-part of Ser. No. 913,339, Sep. 30, 1986, Pat. No. 4,835,819.

[51] Int. Cl.[5] .............. F16B 25/00; F16B 37/00; B21D 53/20
[52] U.S. Cl. .................... 411/428; 411/387; 411/903; 411/914; 470/2
[58] Field of Search ............... 411/411, 424, 428, 287, 411/258, 386, 387, 900–903, 908, 914; 10/10 R, 10 P, 86 A, 86 R

[56] References Cited

U.S. PATENT DOCUMENTS

| | | | |
|---|---|---|---|
| 3,069,387 | 12/1962 | Allen et al. | 411/914 |
| 3,441,073 | 4/1969 | Johnson | 411/287 |
| 3,787,222 | 1/1974 | Duffy | 411/258 |
| 3,814,156 | 6/1974 | Bachmann et al. | 411/428 |
| 3,975,787 | 8/1976 | Newnom | 10/10 P |
| 4,000,982 | 1/1977 | Ueda | 252/12.2 |
| 4,035,859 | 7/1977 | Newnom | 10/10 P |
| 4,080,233 | 3/1978 | McCloskey et al. | 252/12.2 |
| 4,100,882 | 7/1978 | Duffy et al. | 118/308 |
| 4,114,505 | 9/1978 | Loeser et al. | 411/903 |
| 4,285,378 | 8/1981 | Wallace | 10/10 P |
| 4,626,365 | 12/1986 | Mori | 252/12.2 |
| 4,837,090 | 6/1989 | Hyner et al. | 411/903 |

FOREIGN PATENT DOCUMENTS

| | | | |
|---|---|---|---|
| 2733802 | 2/1979 | Fed. Rep. of Germany | 411/903 |
| 119210 | 9/1980 | Japan | 411/903 |

Primary Examiner—Neill R. Wilson
Attorney, Agent, or Firm—Niro, Scavone, Haller & Niro

[57] ABSTRACT

This invention relates to threaded fasteners, an apparatus for making such threaded fasteners and methods of fastening parts. The tip of the shank of a threaded fastener has at least one thread coated with a lubricating or masking material to reduce the drive torque necessary for fastening as well as provide a protective coating for the fastener during subsequent processing operations. The drill tip of the disclosed self-drilling fasteners is coated with a lubricating material to reduce drive torque and to eliminate binding when drilling through fibrous material. The present invention also prevents the build-up of corrosion inhibiting materials on threaded fasteners attached to parts to be fastened together. A masking and/or insulating material is first applied to the threaded fasteners attached to the parts to substantially prevent applied corrosion inhibitor from adhering to the threads of the fastener. A method of fastening parts, including fibrous material such as carpet or sound insulation, is also accomplished through practice of the present invention. The apparatus of the present invention provides a resin type stream entrained in a gaseous jet directed through a nozzle onto the threads of a fastener. The apparatus provides selectable thread coverage, including complete coverage of all threads.

30 Claims, 12 Drawing Sheets

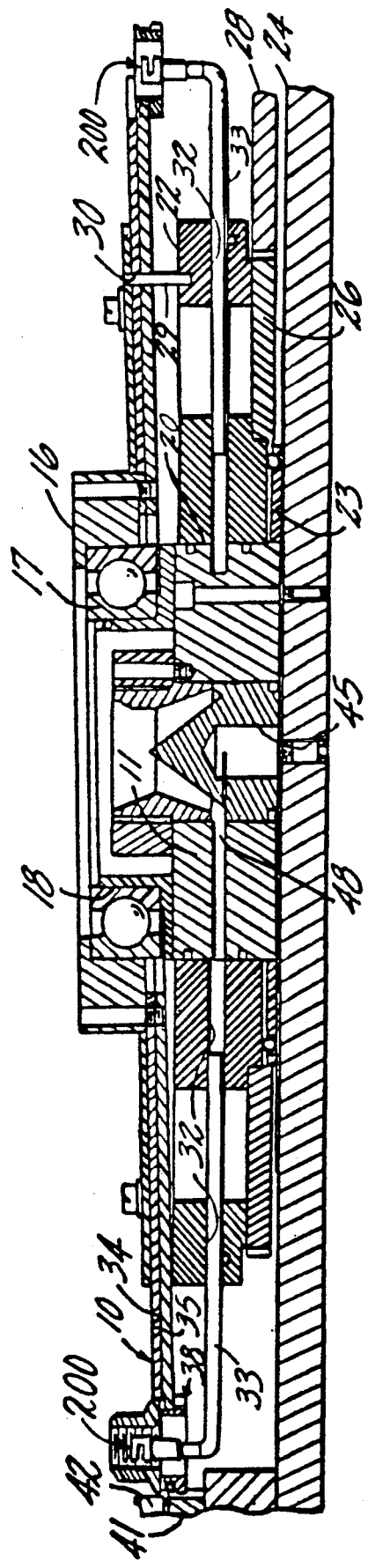
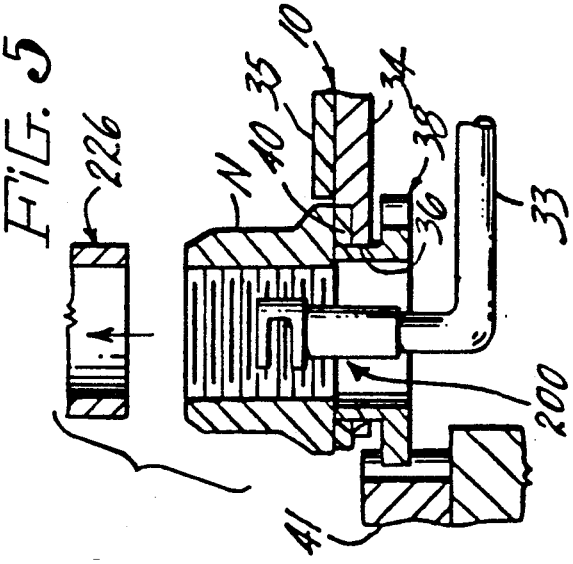
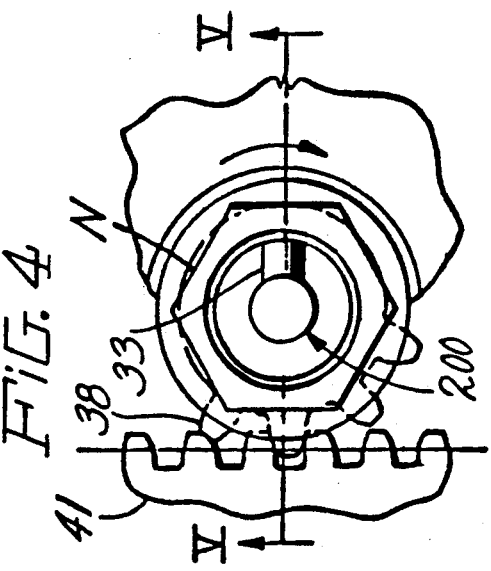
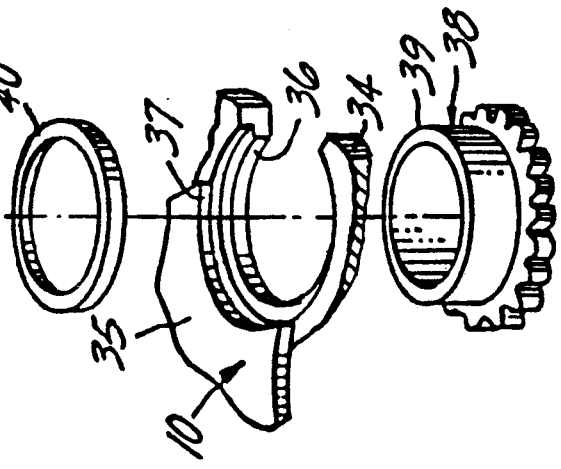

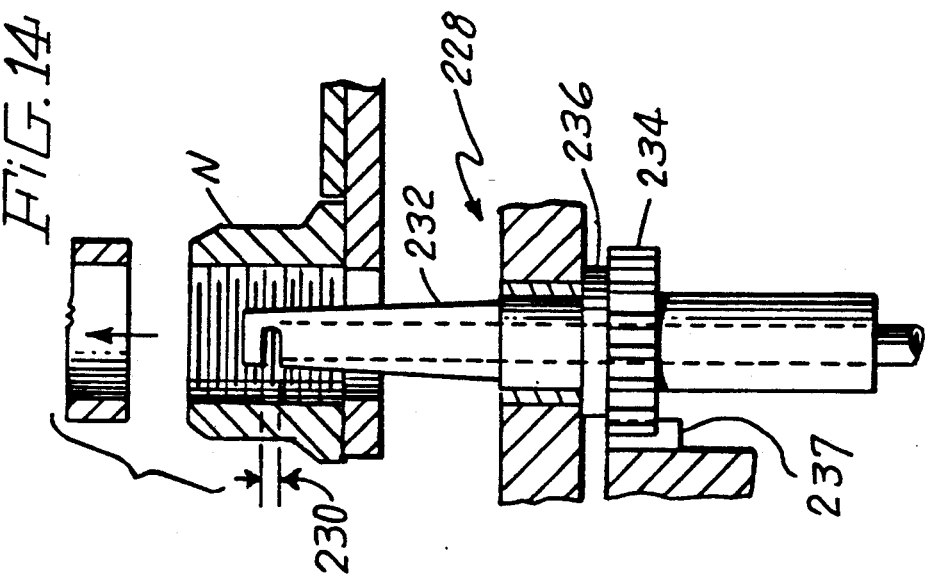
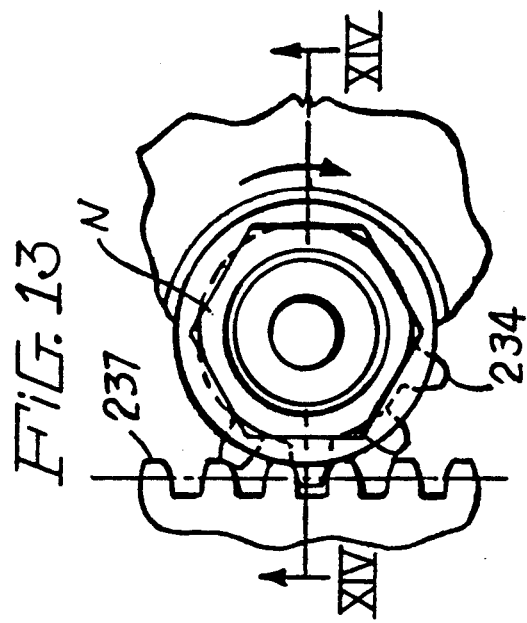

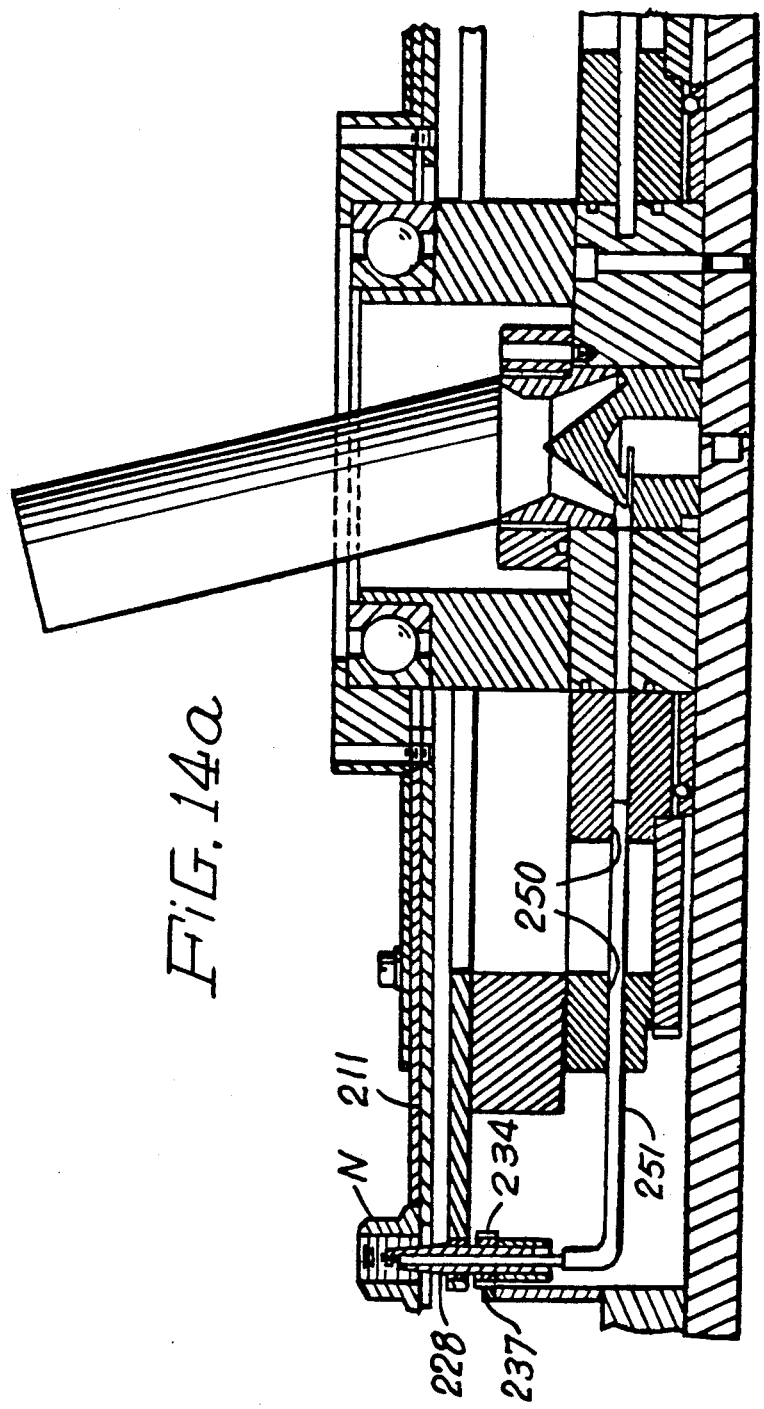

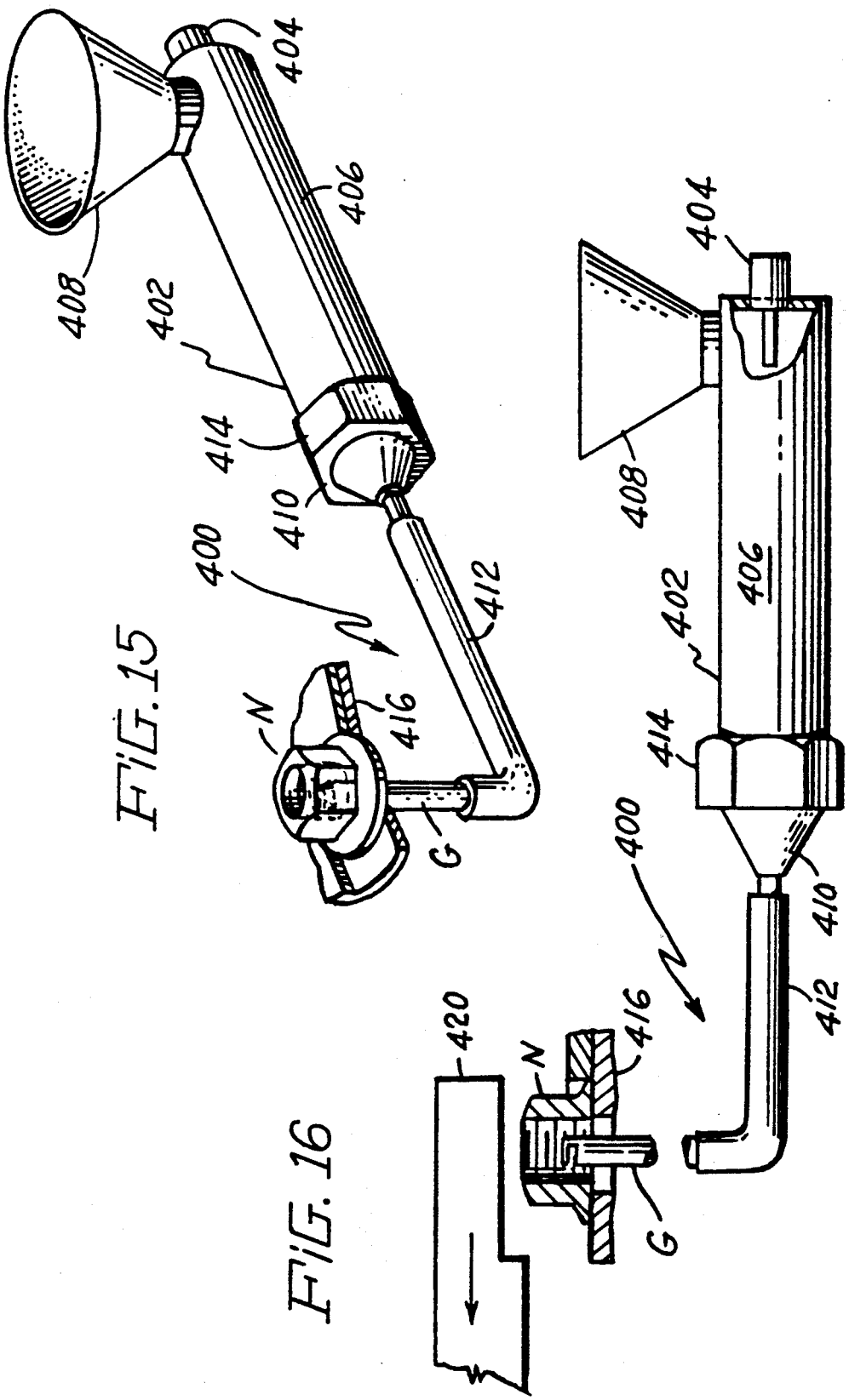

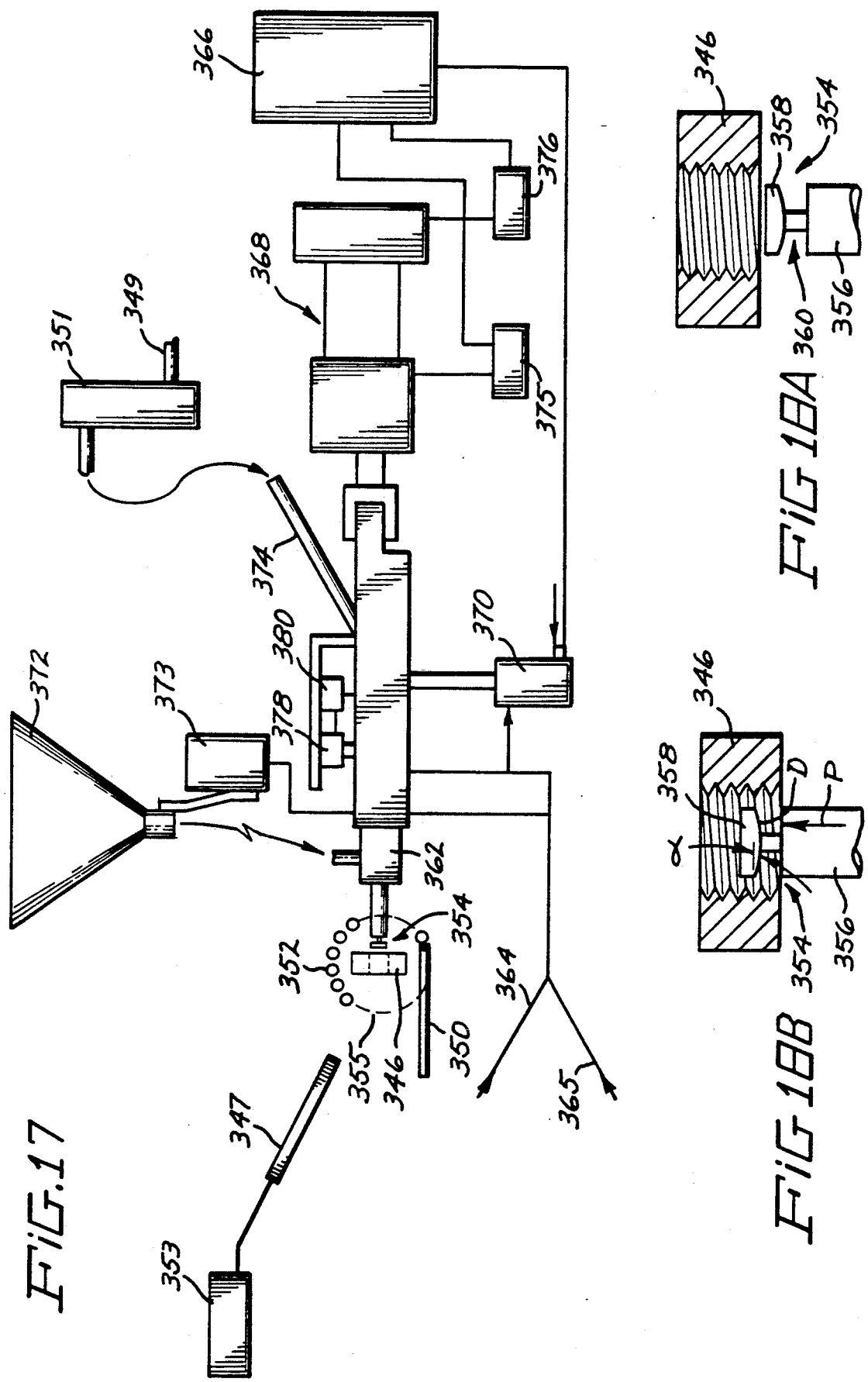

COATED THREADED FASTENERS

This application is a continuation of U.S. application Ser. No. 281,633, filed Dec. 9, 1988, now abandoned, which is a continuation in part of U.S. application Ser. No. 907,582, filed Sep. 15, 1986, now U.S. Pat. No. 4,775,555, and U.S. application Ser. No. 913,339, filed Sep. 30, 1986, now U.S. Pat. No. 4,835,819.

TECHNICAL FIELD OF THE INVENTION

The present invention generally relates to improved threaded elements having a useful coating or patch applied to the threads which masks, insulates and/or lubricates the threads. More particularly the invention relates to fastener elements and apparatus for the processing of such fastener elements wherein a patch is deposited on the threads ranging from a small patch to complete coverage of all the threads to mask, insulate and/or lubricate the threads and a method of using such fasteners.

BACKGROUND OF THE INVENTION

In prior art patents there are disclosed various methods and apparatus for applying locking patches of resilient resin to threaded articles. In the devices disclosed in these patents, generally a rotatable table or transport belts are disposed for receiving fasteners and transporting them through a plurality of stations to effect application of the patch to the threads of the threaded articles or the fastener elements.

U.S. Pat. Nos. 4,054,688 and 4,100,882 are directed to forming patches on fasteners whereby a portion of the heat fusible resin particles is deposited on one area of the hot threads of an element, and thereafter the resin particles are deposited on an additional area of the threads to produce two distinct patches at a desired location. In each of the aforementioned patents, internally threaded articles are retained on a rotatable support member in a selected position by means of a slot which receives a portion of the external surface of a hex head nut. After a discrete patch is applied to the internal threads of the fastener, a turning moment is applied to the fastener to move it such that a different external portion of the threads of the hexagonal element is received by the slot, after which a second discrete patch is applied to the threads of the fastener.

U.S. Pat. No. 3,858,262 is directed to a method and apparatus for making a self-locking threaded element which avoids the difficulties of resin deposit on the end faces of the threaded element and is effective to deposit resin on the selected threads with a minimum of spatter on other portions of the threads. In that method and apparatus as disclosed, a nut or other internally threaded member is heated. While the nut is mounted with its axis in an up-and-down position, the internal threads are sprayed with finely divided resin particles which are caught and built up on the heated surface to form a plastic body.

U.S. Pat. No. 3,894,509 is directed to an apparatus and method for mass production of internally threaded elements, including an automatic means to move a succession of the internally threaded elements through various stations in which the elements are loaded onto a conveying and treating member. A resilient resin locking patch is formed on the threaded surface of the elements by deposition of heat fusible resin powder and thereafter, the elements are unloaded.

U.S. Pat. Nos. 3,416,492 and 4,336,190 are directed to methods and apparatus wherein a self-locking internally threaded element is manufactured having a locking body of resilient resin provided over three hundred sixty degrees of arc of a portion of the internal threads.

Although substantial progress has been achieved in the above patents, it has become desirable to have an improved coated threaded article or coated fastener and a method of using the article which exhibits superior masking, lubricating and/or insulating characteristics. Furthermore, a superior size, shape and type of resin deposit or patch application, including the area of the deposit, shape of the resin spray deposited on the threads and application of the article in various fastening environments not previously obtainable by known fasteners or threaded articles is provided.

By way of example only, in an assembly line for the manufacture of automobiles, trucks and similar vehicles, line speed and uniformity are required in fastening parts together. In a vehicle assembly line, such parts include but are not necessarily limited to door panels, covering trim, fire walls, rugs, insulation and similar automotive parts. Traditionally these parts have been assembled by humans, as well as robots. As the vehicle passes a work station, parts are supplied to the worker which must be assembled into the passing vehicle. Typically, the worker assembles these parts with threaded fasteners and may use an automatic feeding and threading mechanism to install the fasteners.

In assembling parts, the automobile industry has traditionally relied on nuts and bolts, self-tapping and self-threading screws, as well as self-drilling screws. These methods have some inherent difficulties. For example, problems arise when a threaded fastener, such as a bolt or nut, is attached to a part prior to passing the work station. A part may contain a pre-drilled hole or an installed nut or bolt. When that part is dipped and/or sprayed with a corrosion inhibiting material, such as Uniprime or other rust inhibiting coverings, this type of material adheres to one or more of the threads of the fastener and makes fastening extremely difficult and time consuming. Another example can be seen in rugs and sound insulation which have typically been installed with self-drilling fasteners. The fibrous nature of such material commonly causes the fastener to bind in the material and/or increase the drive torque necessary to install the fastener. This results in slowing of the assembly line and/or sloppy installation of the parts. Difficulty has also been encountered in installing self-threading fasteners to attach two parts together. If the holes are not sized properly and/or substantially aligned, then an assembly line worker cannot install the fasteners in the allotted time.

To solve the problem of corrosion inhibitor build-up, the prior art has focused on applying a removable mask coating, such as a preformed cap or tape material, to substantially all of the fastener threads. This has met with only limited success and has not proven to be as safe and cost effective as desired. In attempting to solve the problem of reducing installation drive torque, lubricating coatings such as wax, cadmium wax and the like, have been used with only limited success and safety. These coatings have typically been expensive, inconvenient to apply, and at time have utilized hazardous or toxic materials. Consequently, it has been necessary to search further for an economical and convenient way to reduce the drive torque incurred during a fastening operation, to drill through fibrous materials and to prevent the unwanted adherence of materials such as rust inhibiting coatings to at least selected portions of the fasteners.

It is therefore an object of the present invention to provide an improved coated threaded article or fastener and a method of using the same having a functional resin type material deposited onto the threads of the threaded article or fastener.

A further object of the present invention is to provide an improved coated threaded article and method of using the threaded article wherein the article has an improved application or deposit of resin type material which is applied over a desired arcuate and vertical area of the threads of the article.

A still further object of the invention is to provide a threaded article and method of use having improved definition of the resin type material which is applied over a desired arcuate and vertical area of the threads of the threaded article.

It is also an object of this invention is to provide a coated threaded article having a coating which protects, insulates or masks the threads from unwanted contamination or deposition of material thereon.

SUMMARY OF THE INVENTION

The above objects and other objects, which will become apparent in the description, are achieved by applying resin type material to threaded articles, including fasteners such as nuts, bolts and similar threaded articles and fasteners, and utilizing a method for fastening such fasteners. In one aspect of the invention, a treated form of a structural member having a coupled threaded article adapted to exhibit a uniform torque-tension curve during coupling of a mating fastener to the coupled threaded article is provided. The uniform torque-tension curve characteristic exhibited by the fastener results from application of a masking, insulating and/or lubricating material to the threads of the threaded article. The treated structural member and coupled threaded article are prepared and the threaded article mating fastener are coupled in a process which includes masking of the threads of the threaded article prior to treating the structural member and prior to coupling the mating fastener to the threaded article. The step of masking includes supporting the threaded article for applying the coating material, heating the threaded article to a temperature sufficient to enable the coating material to adhere to the threads of the threaded article, positioning a nozzle adjacent the threads of the threaded article, discharging a gaseous jet containing the coating material from the nozzle toward the threads of the threaded article and depositing the coating material onto the heated threads of the threaded article to form a substantially uniform masking, insulating and/or lubricating coating on the threads of the threaded article. The process also includes coupling the threaded article to the structural member and treating the structural member. The coated threads are thereby masked and/or insulated from the treating step enabling the achievement of the uniform torque-tension curve characteristic for reliably coupling the associated threaded article to the mating fastener.

In another preferred embodiment of the invention, a fastener resistant to the deposition of corrosion preventative material is provided. The fastener includes a threaded portion adapted for engagement with a mating fastener and an insulating coating deposit on the threaded portion to form a substantially uniform layer. The uniform layer provides an insulating barrier to the threads of the fastener when about 500 to 600 volts of electrical potential is applied across the uniform layer for at least two seconds.

One of the uses of the invention as described herein relates to the automobile industry. However, those of ordinary skill in the art will understand that this invention applies to other industries in which parts or goods are assembled by threaded fasteners.

The problems stated above have been largely overcome by the present invention which includes a threaded fastener having a head portion at one end and a threaded shank associated with the head portion. The threaded shank includes a tip portion at the end opposite the head. At least a portion of the tip is coated with a lubricating and/or masking material. The threaded fastener may include a screw, bolt, or similar threaded article. Furthermore, the fastener may include a self-threading screw, a self-drilling screw, or the like. It has been determined that corrosion inhibitor build-up has been substantially reduced by application of such material to the threads of the fastening devices prior to coating with corrosion inhibiting material.

Preferably, at least one thread of the threaded fastener is coated substantially 360° about its threaded shank with the insulating, lubricating and/or masking material. Such a coating reduces binding of the threaded fastener during installation and typically improves the quality of the threaded fastener installation. To prevent corrosion inhibitor build-up on the threaded fastener during such processing, the threaded fastener is preferably substantially completely coated with a lubricating or masking material. This type of coating provides increased ease of fastener installation after completion of the rust inhibitor treatment.

A second embodiment of the fastener of the present invention includes a fastening system having a male segment with a substantially cylindrical threaded member which interlocks with the threaded portion of a female segment. At least one thread of a male or female segment includes a coating of an insulating, lubricating and/or masking material. It may be desirable to coat all of the threads of the male and/or female segment with an insulating, lubricating and/or masking material depending on how the fastening system is to be used.

The method of the present invention includes placing a first article in fixed relation to a second article and placing a threaded fastener having at least one thread coated with a lubricating material through one of a plurality of preformed holes in the first article. The fastener is then threaded into the second article whereby the lubricating material reduces the drive torque produced during the threading operation. This method is particularly advantageous when the fastener is required to be threaded through intermediate layers of a fibrous material placed between the first and second articles. Such insulating material may include insulating and/or carpeting material and the fastener may include a self-drilling fastener to complete the threading operation.

A second embodiment of the method of the present invention includes a method of treating parts including a rust inhibiting material, the parts, which include one or more fasteners thereon, have a threaded portion. Such a method includes applying an insulating and/or masking material to the threaded portion of the fasteners and attaching the fasteners to the parts. The parts are then coated with rust inhibiting material while the rust inhibiting material is prevented from adhering to the threaded portion of the fasteners due to the applied insulating and/or masking material. It may be desirable to apply the insulating and/or masking material to a heated fastener through the use of spraying techniques. This provides a uniform coating of the insulating and/or masking material as the material melts in the presence of heat.

Thus, a coated threaded fastener and apparatus for processing such a fastener is provided which includes an insulating, lubricating and/or masking coating on the threads of the fastener to reduce the installation drive torque of the fastener and protect the fastener from retaining unwanted materials during further processing. The fastener/apparatus and method of using such fasteners of the present invention provide cost savings and increased efficiency over the fasteners and methods previously used.

BRIEF DESCRIPTION OF THE DRAWINGS

For a fuller understanding of the nature and desired objects of this invention, reference should be made to the following detailed description taken in connection with the accompanying drawing, wherein like reference characters refer to corresponding parts throughout the several views of the preferred embodiments of the invention in which:

FIG. 2 is a sectional elevational view taken along the line II—II of FIG. 1, showing details of the structure of FIG. 1;

FIG. 3 is an exploded perspective elevational view, taken on an enlarged scale, showing elements forming an example of a supporting platform in the structure of FIGS. 1 and 2;

FIG. 4 is a top plan view showing an example of a supporting platform of the structure of FIGS. 1 and 2, taken on an enlarged scale to show further details of the elements;

FIG. 5 is an elevational sectional view taken along the lines V—V of FIG. 4; and also showing an adjacent vacuum hood;

FIG. 13 is a top view of another embodiment of a spray applicator used to process the threaded articles and fasteners of the present invention in which the fastener is held stationary relative to the spray applicator that is rotated about its axis;

FIG. 14 is a cross-sectional view of the applicator shown in FIG. 13, taken along the line XIV—XIV. In this view, the gear is shown as disposed on the applicator so that it can be rotated in the apparatus shown in FIG. 14a;

FIG. 14a is a cross-sectional view of one embodiment of an apparatus for processing the threaded articles and fasteners of the present invention that can use the spray applicator shown in FIG. 14. As mentioned above, in this embodiment, the spray applicator is rotated while the threaded fasteners remain in a stationary position relative to the applicator;

FIG. 15 is a side elevational view, partially in cross-section of an embodiment of an apparatus used to process the threaded articles and fasteners of the present invention;

FIG. 16 is a side view of the embodiment shown in FIG. 15 with a cutaway view of the spray applicator stage;

FIG. 17 is a combination schematic/apparatus diagram for an embodiment of an apparatus and process used to process the threaded articles and fasteners of the present invention providing control over patch coverage longitudinally along the threaded article and/or fastener;

FIG. 18A an enlarged view of the spray applicator or the nozzle portion shown in FIG. 17;

FIG. 18B is a similar view to FIG. 18A with the spray applicator and coupled conduit moved relative to the fastener in the view of FIG. 18A;

DESCRIPTION OF THE PREFERRED EMBODIMENT

While the present invention will be described particularly with respect to applying various heat softenable resin particles, fluorocarbon materials and Teflon (a registered trademark of DuPont Corp.) to the threads of threaded articles, it is to be understood that the present invention can be utilized to apply a variety of "resin type materials" to the threads of a fastener, including but not limited to thermoplastic resins, thermoplastic resin compounds, thermosetting resins such as epoxy resin and Teflon type compounds, as well as other plastic and fluorocarbon type materials.

Figure 1:
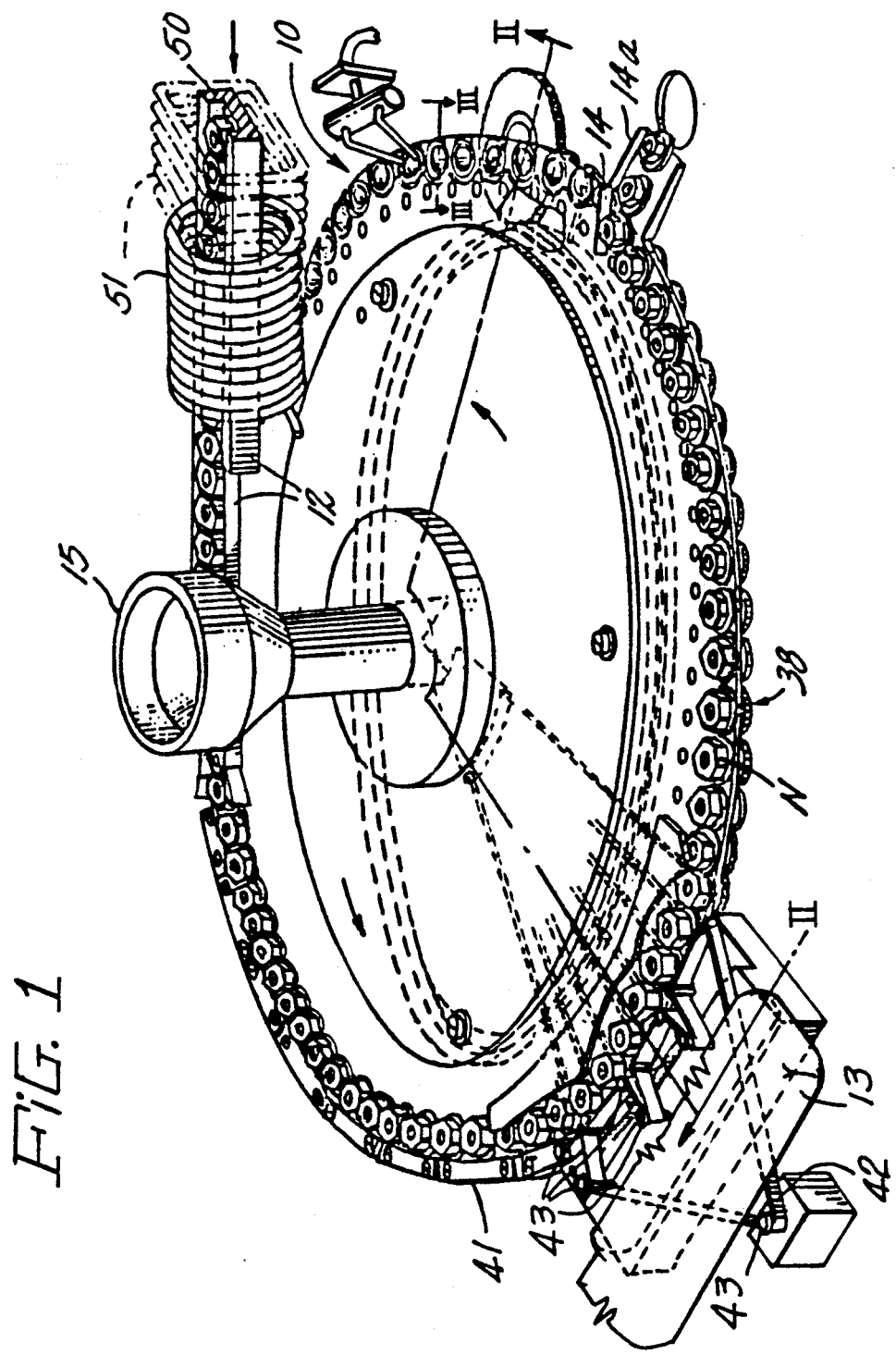
FIG. 1 is a perspective view showing a device for the manufacture of coated threaded articles and fasteners of the present invention.
Figure 12:
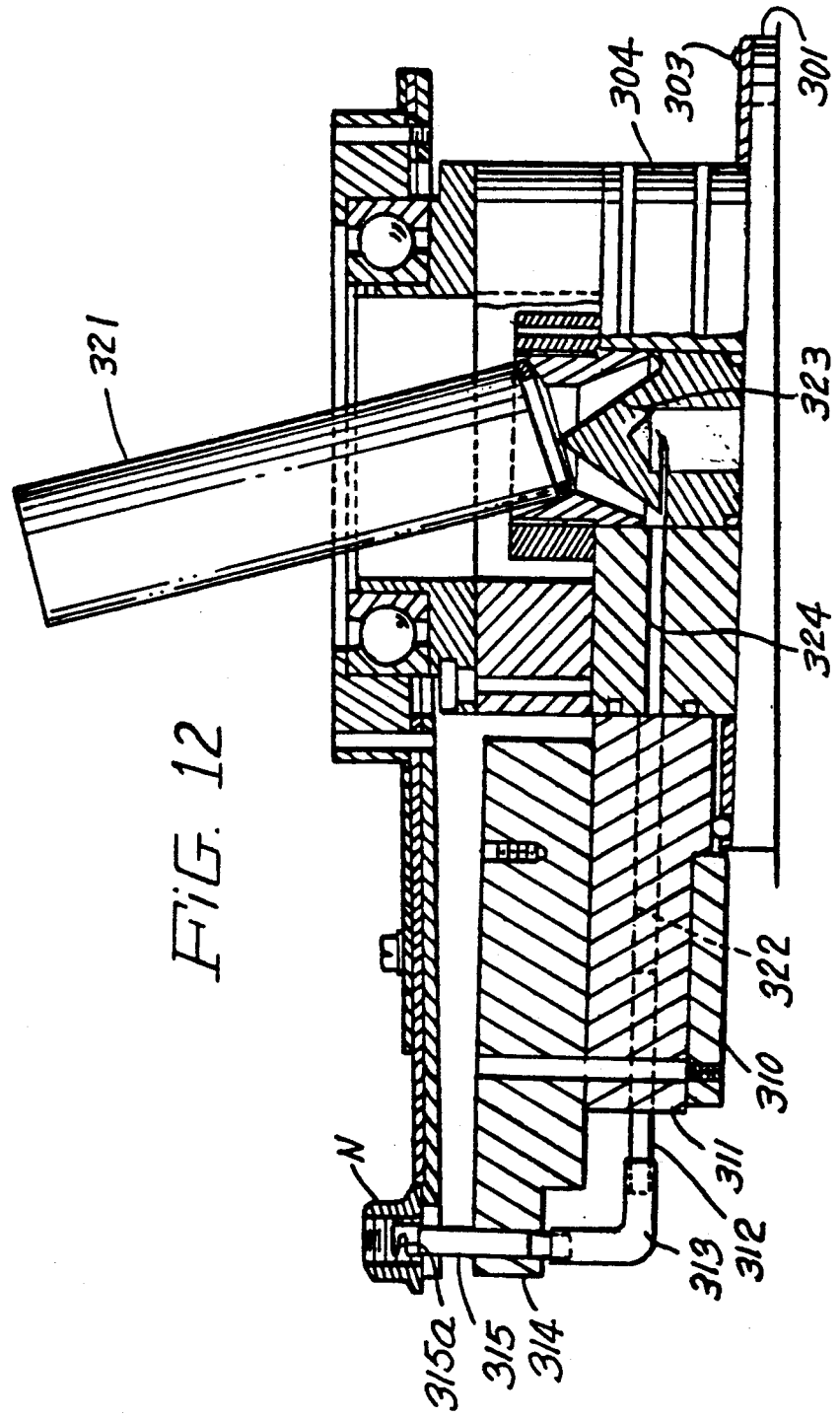
FIG. 12 is a cross-sectional view of another embodiment of the apparatus used to process the threaded articles and fasteners of the present invention. This embodiment is similar to the embodiment of FIGS. 1 and 2, except that the powdered resin is applied at one station only.

Referring to the drawings, and in particular to FIGS. 1 and 2 as well as FIG. 12, there is shown apparatus for the manufacture of a self-locking internally threaded article of the present invention. While the invention contemplates a variety of threaded articles and/or fasteners, including but not limited to nuts, bolts and similar articles, the present invention will be described with reference to a nut. The apparatus as illustrated generally includes a rotatably mounted transport member in the form of a table 10 movable along a predetermined rotary path about its central axis, in the direction shown by the arrows of FIG. 1.

As the table 10 is continuously rotated about a fixed housing 11, a point on the table 10 will be seen to pass through a plurality of stationary work areas referred to as stages of the operation for the purposes of the present description. In the first stage of operation loading chute 12, which is inclined downwardly toward the surface of the table 10, is effective to deposit a nut N onto the table 10. During the next stage a powdered material is applied through a spray operation to the internal threaded surface of the nut N. This stage is substantially enclosed by a vacuum hood 13, the operation of which is explained in detail below.

In the embodiment of FIGS. 1, 2 and 12, a single depositing spray stage is used, with the arcuate angular length of the application varying according to the amount of deposit desired. While a single powder application stage is shown herein, it will be appreciated that multiple powder application stages may also be used, depending on the type of deposit desired.

During the next stage an arm 14, connected to an inclined ramp 14a, and having a cam surface disposed adjacent the upper surface of the table 10 is effective to unload the nut N from the support structure 24 and convey it in an opening in the support structure. During a subsequent stage of operation, which substantially covers that portion of the table 10 located between the unloading station and the loading station, the means for applying resin type material to the nut N are purged of residual material and are readied for the next sequence of operation.

Referring to FIGS. 1 and 2, the stationary housing 11 is provided with a funnel shaped hopper 15 which serves to receive the powdered resin type material for application to the internal threads of the nut N.

Referring to FIGS. 2 and 12, it will be noted that the table 10 is provided with a table hub 16 which receives a ball-bearing member 17. The stationary housing 11 is provided at its upper portion with a bearing surface 18 on which the table hub 16 and the ball-bearing member 17 are received.

The external surface of the housing 11 further provides a second bearing surface 20 on which is mounted a rotatable block 22. The rotatable block 22 rests on a ball-bearing unit 23 disposed on the upper surface of a support structure 24, which also supports the stationary housing 11.

It will be noted from FIG. 2 that the cylindrical portion of the stationary housing 11 on which the second bearing surface 20 is formed, is substantially perpendicular to the support structure 24. Therefore, the rotatable block 22 moves in a plane substantially parallel to the surface of the support structure 24. However, the cylindrical portion of the stationary housing 11 on which the bearing surface 18 is formed is slightly canted with respect to the surface of the support structure 24 providing for rotation of the table 10 in a plane forming a slight angle with the surface of the support structure 24 and the plane of rotation of the block 22.

The rotatable block 22 is provided with a ring gear 26 in meshing engagement with a gear 28 connected to a drive motor. Extending upwardly from the block 22 is a pin 29 which is slidably received in a cylindrical bore 30 formed in the table 10. It will therefore be evident from FIGS. 2 and 12, that operation of the motor to drive the gear 28 causes rotation of the block 22 which in turn drive the table 10 by virtue of the interconnected relationship between the pin 29, the table 10 and the block 22. It should further be evident that rotation of the block 22 and the table 10 causes the block 22 and the table 10 to move to various positions, such as, a distance where the two members are in close relation to one another and to a relative position where they are separated a maximum distance apart in the manner shown.

Referring to FIGS. 1, 2, 5 and 12, the block 22 is shown to have formed therein a plurality of circular cross-section apertures 32 each having an opening inwardly toward the stationary housing 11 and receiving a tube 33 at the opposite end, the tube 33 and the aperture 32 forming in combination a conduit means. Attached to the end of the tube 33 is a spray applicator 200 for controlling the application of resin deposits and which is discussed in more detail hereinafter.

Figure 6:
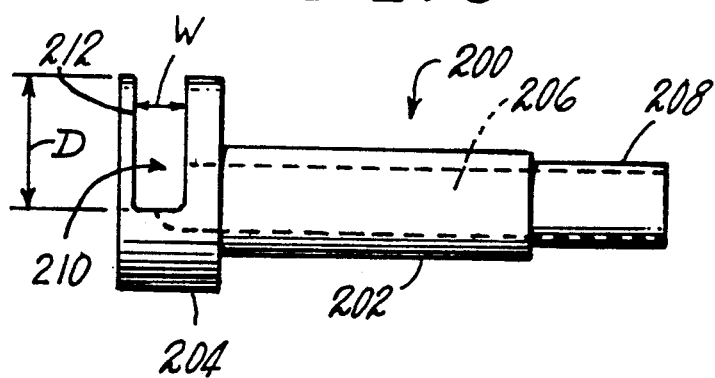
FIG. 6 is a side plan view of the spray applicator for use in processing the threaded articles and fasteners of the present invention.
Figure 9:
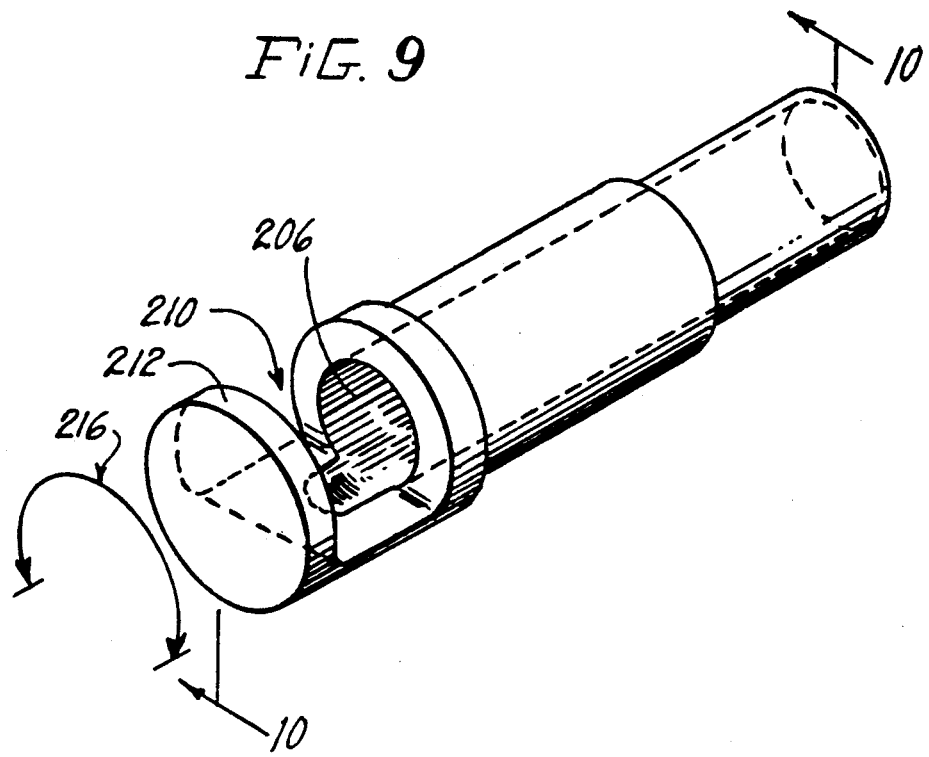
FIG. 9 is a perspective view of the spray applicator of FIG. 6.
Figure 10:
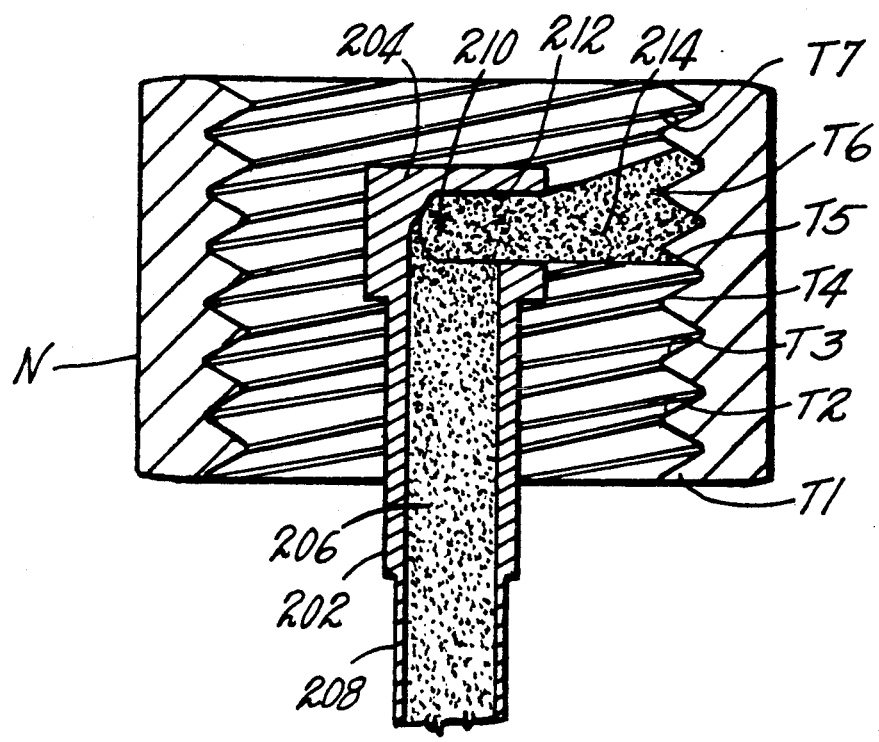
FIG. 10 is a cross-sectional view of the spray applicator with a gaseous jet of resin type material impacting the threads.
Figure 11:
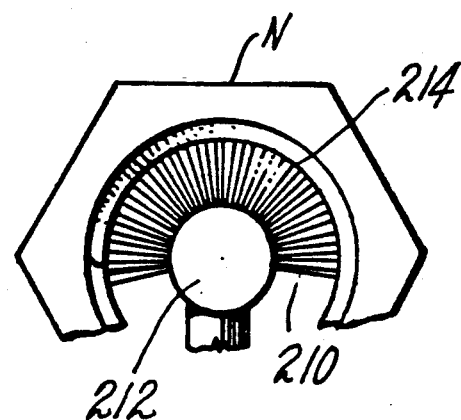
FIG. 11 is a top plan view of FIG. 10 showing the fan-like spread of the stream of resin particles.

Referring more particularly to FIGS. 6, 9 and 10, there is illustrated generally at 200 the spray applicator constructed in accordance with one form of the present invention. The applicator 200 comprises an elongated conduit portion or shaft 202 and a nozzle portion 204. These nozzle and conduit portions have a cylindrical passage 206 therein which is preferably concentric with the shaft 202. In FIG. 6, the cylindrical passage (also the inner diameter of the conduit or shaft 202), is shown by the dotted lines. The passageway extends from a rear portion 208 of the conduit 202 to the nozzle portion 204 where it curves slightly upward at its entrance to the nozzle portion 204. The nozzle 204 is provided with a slot or opening 210 which communicates with the cylindrical passage 206. The nozzle portion 204 is preferably cylindrical in configuration having an end portion which forms a deflector surface 212. It has been discovered that varying the width W of the slot 210, as best seen in FIG. 6, enables varying the area of the resin deposit or patch applied. Control of the area coated, and thus the number of threads coated, permits improved masking of the internally threaded area, as well as improved definition of the applied resin type material. Control in this manner allows one to selectively avoid coating one or more of the leading threads, therefore maintaining certain threads free of resin particle deposit, providing improved torque performance and enabling easy assembly of the fastener with a mating member. This feature is illustrated in FIG. 10 where as shown the stream of resin particles 214 is controlled so that the initial threads T1, T2, T3 and T4, as well as the last thread T7 of fastener N are free of resin particle deposit while threads T5 and T6 are coated.

It has been determined that the arcuate width of the slot opening 210 is important in the control and velocity of the resin particle stream, as well as the arcuate coverage of the internal fastening threads. Particularly, it has been found that when the circumference of the slot opening is in the range of between about one hundred ten degrees to about three hundred ten degrees, an acceptable resin deposit or patch is applied. Spattering is further minimized, while optimum velocity is also maintained, when the circumference of the slot opening 210 is preferably in the range of between about one hundred eighty degrees to about three hundred degrees. The circumferential opening of the slot 210 is illustrated by the arrows 216 of FIG. 9.

It has also been determined that the proportional relationship of the diameter of the nozzle to the minor or inner diameter of the fastener to be treated is also important in the deposition of the resin particles. The diameter of the nozzle should be sixty to eighty percent and preferably sixty-five to seventy-five percent of the inner diameter of the fastener to be treated to provide improved control and reduced spatter of the stream of resin particles applied to the internal threads. Accordingly, variations in the size of the diameter of the nozzle and its conduit portion relative to the size of the inner diameter of the fasteners to be treated are contemplated by this disclosure.

Figure 7:
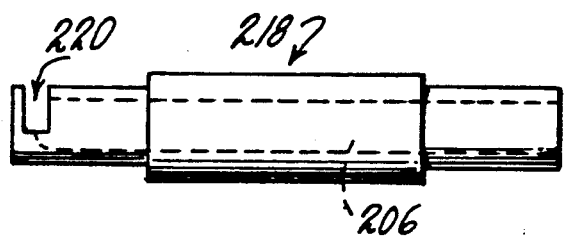
FIG. 7 is a side view of a spray applicator for use in processing the threaded articles and fasteners of the present invention.
Figure 8:
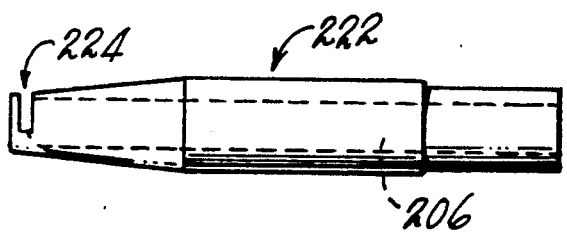
FIG. 8 is a side plan view of a third spray applicator for use in processing the threaded articles and fasteners of the present invention.

The optimum diameter of the nozzle for the above embodiment, providing effective and efficient deposition of resin particles, as well as improved patch definition to attain improved torque performance, is approximately seventy percent of the inner, or minor, diameter of the fastener. Nozzles that are sixty to eighty percent of the inner diameter are within the operable range and provide acceptable applied patches. Examples of such variations in size of the nozzle diameter are illustrated in FIGS. 7 and 8. The applicator 200 of FIG. 6 represents a relatively large size diameter nozzle. The applicator 218 and the nozzle 220 of FIG. 7 represent generally an intermediate size configuration, and the applicator 222 and nozzle 224 of FIG. 8 represent generally the configuration of a form of the applicator 200.

The range of patch coverage for the arcuate internal threaded surfaces of a fastener is also somewhat sensitive to the adjustable depth of the slot or opening 210. For this particular embodiment it has been determined that such a relationship may be expressed as a percentage of the diameter of the nozzle portion 204 of the spray guide applicator 200. Specifically, in order to obtain a desirable patch of sprayed resin type material, the slot depth D is maintained at between about thirty percent to about eighty-five percent of the diameter of the nozzle position 204. Further, it is preferred that the slot depth D be in the range of between about forty-five percent to about seventy-five percent of the diameter of the nozzle portion 204.

The cylindrical passageway 206 is constructed to be as large as possible (as illustrated by the dotted lines in FIGS. 6-9 inclusive) consistent with maintaining strength of the walls of the conduit portion 202. Larger passageways maximize the volume and amount of resin type material which can be directed through the conduit portion 202 while minimizing the amount of air or gas pressure and the velocity of air required to move the resin type material through the spray applicator 200. This feature improves the definition of the resin deposition area by reducing spattering caused in part by higher air pressures and velocities.

The spray applicators 200 of the illustrated form of the invention are preferably formed of metals and alloys which readily dissipate heat acquired by radiation or inadvertent contact with the heated fasteners. Construction using these materials reduces the adherence of resin type material on the walls of the applicator passageways and helps eliminate clogging or restricted flow. Aluminum and aluminum alloys are examples of suitable metals for forming the spray applicators 200. Applicators made of steel, for example, are generally less preferred since steel tends to hold the heat transferred from the fasteners with the result that clogging and restricted flow may occur. Accordingly, consistent with the principles of the present invention, the spray applicators 200 are maintained free from contact with the heated fasteners.

As shown in FIGS. 2, 3 and 5, the table 10 comprises an upper plate 35 and lower plate 34, the lower plate having a plurality of circular openings 36 formed about its periphery and the upper plate 35 having a plurality of semi-circular walls 37 forming the outer periphery adjacent the openings 36. The tube 33 is in communication with each of the openings 36, and thus rotation of the table 10 and block 22 causes the tubes 33 and the connected applicators 200 to be moved upwardly through the openings 36 to a position shown at the left of FIG. 2 and downwardly to a position shown at the right of FIG. 2. This up and down movement is provided due to the angular orientation of the plate and block during rotation of table 10 and block 22, as described above.

As best shown in FIGS. 3-5, in one embodiment of an apparatus for manufacturing the fasteners of the present invention, at each of the openings 36 in the lower plate 34, a pinion gear 38 is assembled by inserting a tubular flange 39 of the pinion gear 38 through the opening 36 from the underside of the plate 34. Locking ring 40 is then press fit onto a flange 39 to attach the pinion gear 38 to the plate 34. The locking ring 40 is of a thickness to be received in a counter bore formed in the lower plate 34 such that the upper surface of the ring is flush with the top surface of the lower plate 34. Clearance between the opening 36 and the flange 39 is such that the pinion gear 38 is free to rotate when so assembled.

Referring now to FIG. 1, taken together with FIGS. 4 and 5, at selected arcuate segments of the path of circular rotation of the table 10 and the block 22, one or more racks 41 are disposed such that the teeth of the rack 41 are brought into meshing engagement with the teeth of the pinion gear 38 during rotation of the table and block combination. The rack 41 is mounted to the upper surface of the stationary support structure 24 as best shown in FIGS. 2 to 5. While the means for contacting the pinion gear 38 is shown herein as the stationary rack 41, it should be evident that such means could be a variety of interengaging structures. Such structures include, but are not limited to circular ring gears having internal teeth aligned to mesh with the pinion gear 38 at desired locations, or portions of such a gear employed in a similar fashion as the described racks.

In accordance with one form of the invention, means may be provided at the spraying stage, beneath the hood 13, to contact the outer flange face of the periphery of the nut N, while the nut N is being processed at that stage. As shown in FIG. 1, a silicone belt 42 is threaded over a plurality of pins 43 to form a substantially arcuate belt surface, conforming to the periphery of the flange on the nuts N, as they are rotated.

In operation the illustrated embodiment of FIGS. 1 and 2 employs the principles taught in U.S. Pat. Nos. 3,995,074, 4,054,688 and 4,100,882 in dispensing material from the funnel 15 to the exit point from the outer end of each of the tubes 33. Briefly stated, at the hopper 15 are provided preferred resin type materials including, but not limited to Teflon, Teflon compounds, resin powders, thermosetting resins, thermoplastics, nylon powders, resin powders and similar sprayable powders. The powders are forced through the tubes 33 by fluid pressure generated by an air pump (not shown), the air pressure being introduced into the circular bore 45 in the housing 11. In the illustrated embodiment it is desired to provide continuous deposition of resin type material on the fastener throughout an arcuate segment of rotation of the table 10. Accordingly, as shown in FIG. 2, the table 10 includes an arcuate bore 48 provided in the housing 11 extending over an arcuate segment of rotation of the table 10 through the housing from the circular bore 45 to the circular aperture 32 when aligned with the arcuate bore 48.

Referring now to FIG. 1, a sequence of operational steps will be described in which it is desired to provide a locking patch over three hundred sixty degrees of a portion of the internal threads of the fastener element N. In practicing the teachings of the illustrated embodiment, fasteners N are fed from a vibrator device or similar orienting and feeding device (not shown) into a chute 50 which is surrounded by heating means, such as, a heating coil 51. The fastener N is raised to a temperature sufficient to cause a powdered resin type material to adhere to the threaded surface of the fastener when contacted thereby and fused by heat from the surface to form a continuous patch. As each fastener N approaches the table 10, the fastener will be deposited in registry with the semi-circular wall 37 of the plate 35 (see FIGS. 2 and 3).

In the described typical cycle operation, a plurality of the fasteners N are contained on a vibratory feeder or other device (not shown) which is effective to feed the fasteners into the chute 50 where they are passed through the heating coil 51 and raised to a temperature sufficient to cause a resin type material powder to adhere to the threaded surfaces of the fasteners.

Each fastener N is in turn located in a position as shown in FIGS. 4 and 5 wherein the flange of the fastener N is disposed on the surface of the table 10 adjacent the semi-circular wall 37, supported partially by the tubular flange 39 of the pinion gear 38 forming a rotatable platform for the fastener N. The fastener N is then passed into an area along the circular path of the table 10 wherein the circular cross-section aperture of the tube 33 is open to the arcuate bore 48, providing the flow of the resin type material through the bore and tube 33 and onto the threads of the flanged nut N.

In the instances where a patch is to be applied about the complete circumference of a portion of the internal threads of the nut N, (i.e. a three hundred sixty degree patch is desired), rotation of either the spray tubes and/or the nut to be processed can be accomplished in the embodiments shown in FIGS. 1, 4, 5, 13, 14 and 14a in order to obtain a satisfactory applied patch. In other instances, rotation of the nuts or spray tubes is not desired and resin is deposited on a portion of the three hundred sixty degree path of the internal threads, as described in detail above. Accordingly, in one embodiment, rotation of the nut is accomplished as the nut N approaches the point where the aperture 32 of the tube 33 is positioned for flow of resin type material. Specifically, the pinion gear 38, on which the fastener N is resting, is brought into meshing engagement with the rack 41. The pinion gear 38 is then caused to turn, thereby rotating the fastener N during deposit of the resin type material and applying a three hundred sixty degrees patch about a desired portion of the threads.

In an alternate embodiment shown in FIG. 12, the structure and operation of the apparatus is similar to the embodiment shown in FIGS. 1 and 2. The apparatus is disposed upon a spacer 301 which supports a post 304. A gear 310 that is carried upon a horizontal ring tube 311 which rides upon a ball bearing 303 about a post 304. A horizontal tube 312 is fitted in an internal conduit 322 formed in the ring tube 311. One end of an elbow 313, generally formed of a plastic tubing material, is fitted on the end of the horizontal tube 312. The other end of the elbow 313 is fitted onto the spray applicator 315. The spray applicator 315 is rigidly disposed in a tube holder 314 that is affixed to the ring tube 311. Resin type particles that are to be applied to the threaded fasteners flow through a powder feed tube 321 that is canted at an oblique angle to the apparatus. As the powder emerges from the feed tube 321, the particles strike the generally conically shaped disperser 323 from whence it flows through a conduit 324 formed in the post 304. As the internal conduit 322 indexes in front of the conduit 324, powder will flow into it and thence into the tube 311 and finally into the spray nozzle portion 315. As the powder emerges from the mouth 315a of the nozzle portion 315, it impinges upon the nut N and deposits upon the threads as described previously.

Figure 14B:
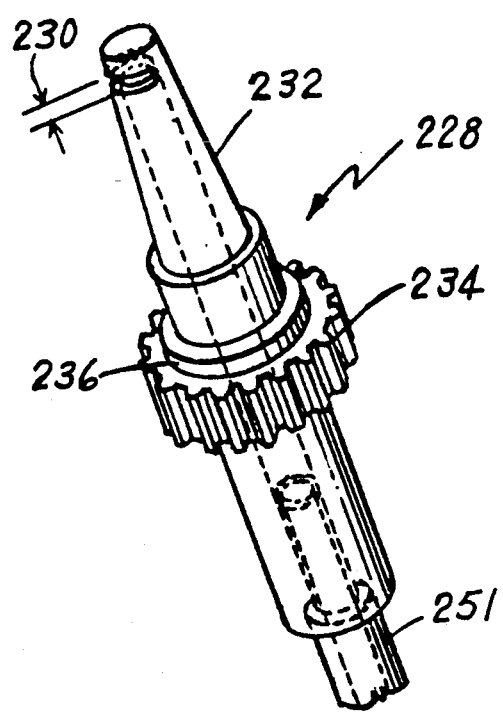
FIG. 14b is a perspective view of the spray applicator and gear shown in FIG. 14.

In another embodiment as illustrated in FIGS. 13, 14 and 14b, a three hundred sixty degree patch application can be achieved by rotation of a spray guide applicator 228 through which the powdered material is sprayed. In this regard the spray applicator 228 has a nozzle opening 230 and a coupled conduit portion or shaft 232, and further included is a pinion gear 234. The pinion gear 234 is press fit over the end, opposite the nozzle opening 230 and is positioned on the shaft 232 so as to abut a shoulder 236 on the shaft 232.

As can be seen in FIG. 14a, the pinion gear 234 is rotated as it approaches the point at which an aperture 250 of a tube 251 is positioned for flow of resin type material, so as to apply a three hundred sixty degree patch or ring to a portion of the internal threads of the fastener N. This operation is similar to that described above in reference to FIGS. 4 and 5. Specifically, the pinion gear 234 is brought into meshing engagement with a rack 237 which causes the pinion gear 234 and an attached spray guide applicator 238 to rotate within the fastener N. The rack 237 includes a pawl and spring (not shown) which together act as an expandable guide path for accepting the pinion gear 234 and preventing backward motion. Construction in this manner helps to alleviate path alignment problems which could be caused by misalignment of the pinion gear 234 and the rack 237.

This spraying operation described above takes place for at least one complete rotation of the spray applicator 228 over a predetermined arcuate path of travel of table 211 in FIG. 14a so that a three hundred sixty patch or ring of minimum acceptable thickness is applied to a portion of the internal threads of fastener N. It should be understood that powder flow can be adjusted during the spraying operation to adjust the amount of the resin type material deposited on the fastener during that time period. Such adjustment of powder flow accordingly determines the thickness of the patch which will be applied to the fastener threads.

As previously described with reference to FIG. 2, the arcuate bore 48 is designed and fabricated to include that arcuate portion of the table rotation adequate to cover the desired portion of the internal threads on which the patch is to be deposited, taking into account the rotation of each fastener N or the spray applicator 200 relative to the rotation of the table 10. As an example, if its is desired to deposit a patch covering the full three hundred sixty degrees of a portion of the internal fastener threads, the arcuate bore 48 will be disposed over an arc through which the table 10 travels during at least one rotation of the fastener N or rotation of the spray applicator 200 through three hundred sixty degrees.

While covering the full three hundred sixty degrees of a portion of the internal fastener threads is preferred in certain instances, a fastener satisfactory for selected purposes, such as acceptable torque performance and patch definition, can be accomplished by covering less than three hundred sixty degrees of the fastener threads. It has been determined, for example, that satisfactory torque performance can be obtained from an internally threaded fastener being used one time by having thread coverage in the range of between about ninety degrees to three hundred sixty degrees. More preferably, for internal arcuate thread coverage a range of from about between one hundred ten degrees to about two hundred seventy degrees is often best.

In the situation where the fastener will be subject to reuse, it has been determined that internal arcuate thread coverage in the range of between about one hundred thirty degrees to three hundred sixty degrees provides satisfactory torque performance. A more preferred range for reusable fasteners is between about one hundred eighty degrees to two hundred seventy degrees of internal arcuate thread coverage.

In another embodiment shown in FIG. 17, the patch of resin type material is applied to the threads of a threaded article 346 having at least one open end and typically open at both ends, such as for nuts. The apparatus includes means for supporting the threaded article 346, such as, for example, a simple mounting shelf 350 as shown in FIG. 17. Heating means is provided to heat the threaded article 346 to the temperature needed to cause adherence of the resin type material to the threads. The temperature of the threaded article 346 is sensed in a known manner by an optical pyrometer 353 and coupled fiber optic sensor 349. In the illustrated embodiment the heating means is an RF induction heating coil 352. A nozzle portion 354 shown in FIG. 18 is also provided for spraying the resin type material onto the threads. The sprayed type material which does not adhere to the threaded article 346 is removed by suction means, such as vacuum nozzle 355 shown in phantom in FIG. 17. Various means can be used for generating the gaseous jet containing the resin type material. A stream of gas for producing the gaseous jet is provided by an air input 349 and coupled flow meter 351 generating the desired gaseous jet which combines with the resin type material. Additional details of the source and control of resin type material will be discussed hereinafter.

In FIG. 18 are shown details of the configuration of the nozzle portion 343. A cylindrical conduit 356 and an end plate 358 of the nozzle portion 354 cause the gaseous jet containing the resin type material to pass along path P through the conduit 356 disposed between the open ends (or the two open ends of a nut) of the threaded article, and path P is substantially parallel to the longitudinal axis of the threaded article 346. The gaseous jet then continues along the pat P until striking the end plate 358. The gaseous jet is diverted along path D toward the threads of the internally threaded article 346. The directions of flow of the gaseous jet at nozzle opening 360 after diversion along path D are substantially perpendicular to and radially extending about the longitudinal center line of the threaded article 346. In a preferred embodiment that gaseous jet is diverted along path D, forming a substantially circular thin layer at the nozzle opening 360. The longitudinal extent of the layer is controllable by varying the size of the nozzle opening 360, such as by using a set of different fixed opening sized of the nozzle 354 or by having continuous variability of the nozzle opening 360 through displacement of the end plate 358 relative to the terminal end of the conduit 356. Means for accomplishing this relative displacement can include, for example, a threaded drive shaft 362 coupled to the end plate 358, a hydraulically driven form of the drive shaft 362 or other equivalent means for relative displacement of the conduit 356 and the end plate 358. Additional control of the shape of the gaseous jet emerging from the nozzle opening 360 includes changing the angle of radial inclination of the end plate 358. In a preferred form of the invention this angle of inclination, alpha, shown in FIG. 18B, is approximately two degrees in order to avoid overspray onto undesired portions, such as the face portions at either end of nuts.

Relating to the above mentioned adjustability of the nozzle opening 360, there is included means for selectively moving and controlling the spatial position of the nozzle portion or spray applicator 354 illustrated in detail in FIG. 18. At the beginning of an operational duty cycle of forming a patch, the internally threaded article 346 is first positioned to establish the terminal end of the nozzle portion 354 at the position shown in FIG. 18A. The apparatus is actuated by an operator 364 or by an automatic control 365 (shown schematically) applying electrical power to a solenoid operated directional valve 366. The direction valve 366 accomplishes movement of the nozzle portion 364 into the opening of the internally threaded article 346 by air input from the directional valve 366 to an air drive cylinder 368 coupled to the applicator portion 364. Activation of the apparatus and/or movement of the drive cylinder 368 is also coupled through a relay 370 to a powder dispenser 372 and associated electric vibrator 373 and also to an air spray unit conduit 374. This coupling of components enables delivery of powdered resin type material from the powder dispenser 372 and generation by the air spray unit 374 of an air stream. The powder and air stream are then combined in the conduit 356 to form a gaseous jet containing the resin type material. As discussed hereinbefore, the gaseous jet is output along the path P shown in FIG. 18B, striking the end plate 358, and the powdered resin type material in the gaseous jet is diverted along path D to the threads of the threaded article 346 to form the patch thereon.

The rate and direction of travel of the nozzle portion 354 along the longitudinal axis of the threaded article 346 can be controlled by the pressure level, as regulated by flow control valve 375 for forward motion and flow control value 376 for rearward motion. To vary the length of travel for the nozzle portion 354, microswitches 378 and 380 are used in the illustrated embodiment to determine the reverse motion and stop positions, respectively, for the air drive cylinder 368 coupled to the nozzle portion 354. At the end of the chosen duty cycle the microswitches 378 and 380 also can deactivate powder flow from the powder dispenser 372 and flow of the gaseous jet. The end of the duty cycle can be, for example, at the end of the forward stroke position of the drive cylinder 368 or can be at the return to the starting position, or multiples of the selectable positional ranges.

Other means for controlling start, reverse motion and stop positions for the drive cylinder 368 can be used, such as, for example, a plurality of microswitches or a rheostat positionally coupled to the location of the drive cylinder 368 to enable carrying out a voltage controlled duty cycle for the nozzle portion 354. Moreover, such means can be coupled to the flow control valves 374 and 376, enabling the velocity of the drive cylinder 368 to be controlled throughout the range of the duty cycle. This feature allows careful control of relative amounts of resin type material deposited along the length of the threads encompassed by the duty cycle.

A particularly advantageous use of the embodiment of FIGS. 17 and 18 is the application of a Teflon type patch, preferably covering all the threads of the threaded article 346 with a masking, lubricating and/or insulating covering. A thermoplastic type Teflon, such as Teflon-P powders (see DuPont Technical Information Pamphlet TI-13-84, incorporated by reference herein) is sprayable onto the heated threads of a threaded article forming a Teflon covering which masks, insulates and/or lubricates the threads of a threaded article. The threaded article 346 undergoes the aforementioned processing steps with the gaseous jet containing the Teflon-P powders sprayed from the nozzle 354 onto the threads. The threaded article 346 is raised to a temperature of about 700° F. by an RF generator, and a substantially uniform Teflon covering is achieved with a layer thickness being at least about 25 to 50 microns. In an average case the thickness at the root and crest of the threads was about 20 to 30 microns. In preparing the Teflon coatings it was found to be unnecessary to perform the recommended DuPont post preparation heat treatment (see DuPont Pamphlet TI-13-84 indicated above). A finished substantially uniform, pinhole free Teflon covering which masked, lubricated and/or insulated the threads of the article was obtained in most instances directly from the spray application process. In some cases, such as for small nuts which cool rapidly, it is desirable to perform a post layer formation step of pulse heating at about 700° F. for a few seconds to achieve better Teflon coating integrity and performance characteristics. It should be understood that any short heat treatment based on known methods and apparatus can be used to perform this post deposition heat treatment.

The current commercial grade DuPont Teflon-P powders have an average size of about thirty-seven microns and a size range from one to one hundred microns. Different size distribution Teflon-P powders are also available from DuPont Corp. Although Teflon-P powder from DuPont Corporation is preferably used for preparing the desired Teflon coatings, other similar formulations of powders having substantially the same chemical makeup and particle size distribution can be used with equal effectiveness.

Fasteners prepared in accordance with the above described procedure have found particularly significant use in joining treated structural members to other structures. Recent progress been made in improving the corrosion resistance of automobile bodies using formulations for treatment of steel structural members, such as, for example the PPG Corporation Uniprime coating product (Uniprime is a trademark of PPG Corporation). When treating an automobile structural member using Uniprime, the cured material forms a protective layer over the underlying metal. When a fastener coupled to the structural member is engaged with its mating fastener and the threads of the coupled fastener or the mating fastener are coated with Uniprime, it is virtually impossible to obtain the proper fastener tension in the standard assembling operation involving the torque-tension measurement on the fastener coupling.

A proper torque-tension curve or test insures achievement of a prescribed range of bolt or fastener tension for fastener coupling. However, the presence of the Uniprime layer can result in many problems, such as stalling of the bolt driver and result in unknown bolt tension. The Uniprime layer can also undergo cracking and separation, causing anomalous torque-tension results. A mask layer can be placed over the threads to prevent contamination from Uniprime, as well as to prevent other interfering, or extrinsic, contaminants from being deposited on, or remaining on the threads by enabling ready removal from the threads. A properly prepared mask layer which masks, insulates and/or lubricates the threads of the fastener can thereby insure a reliable torque-tension curve result for fastener couplings. The Teflon coating, however, should be reliably and uniformly placed over all the threads, but preferably not on other fastener surfaces which are often desirably coated with Uniprime or other corrosion preventative materials or with finish coatings.

Other methods have been tried and have been unsuccessful, both for internally threaded articles and externally threaded articles. Due to the low viscosity, liquid application of the Teflon covering to internal threads causes highly irregular coverage, and for external threads on bolts only electrostatically charged liquids have heretofore found success. The Teflon covering must be uniform in thickness and should be substantially free of pinholes in order to avoid deposition of on the threads small quantities of Uniprime, or deposition on the threads of other extrinsic contaminants which cannot be readily removed from the threads.

Using the above described powder spraying techniques and apparatus, the desired substantially uniform Teflon type covering can be provided to mask, lubricate and/or insulate the threads of a fastener, enabling highly reliable torque-tension tests or curves to be obtained after installation of the fastener and further processing of the structural member on which the fastener is installed. The ability to carry out such reliable tests achieves a high yield of fastener coupling with the desired strengths and much higher commercial production efficiency. Various types of fasteners can be coupled to a structural member and can benefit from the invention. These fastener types can include, for example, nuts, studs, bolts, internally threaded wells and an internally and externally threaded bolt.

In general the preferred form of the apparatus for producing fasteners of the present invention includes vacuum means, such as a hood shown in FIG. 1, for producing a suction force or a negative pressure at the vacuum nozzle 355 in the embodiment of FIG. 17. The vacuum means functions in a manner similar to those systems disclosed in the aforementioned prior art, serving to remove excess material during the application of a patch. One main requirement of such vacuum producing means is to provide a negative pressure or suction area adjacent the upper opening of internally threaded fasteners for drawing air in through the opening at the lower end to reduce deposition of resin type materials which have passed through the threaded portion of the fasteners.

FIGS. 15 and 16 illustrate another embodiment of the apparatus used to produce fasteners of the present invention. Specifically, a single unit apparatus is shown for preparing nuts one at a time and is illustrated generally at 400, and includes a chamber 402 into which air is directed at one end through inlet 404. Chamber 402 includes a passageway 406 extending substantially across its length. A powder funnel 408 is positioned proximate t the inlet 404 and in communication with the passageway 406 of the chamber 402. The chamber 402 also includes an air exit port 410 at its end opposite that of the inlet 404 to which one end of the conduit 412 is removably attached through a mounting structure, such as threaded sleeve 414. The opposite end of the conduit 412 is attached to any applicator G of the spray applicators described hereinbefore. Specifically, a spray applicator similar to the spray applicator 218 of FIG. 7 is illustrated; however, any size applicator G can be substituted depending on the size of the nut N being processed.

The spray applicator G is directed through a nut support 416 on which a fastener or nut N is placed for processing. A vacuum hood 420 is typically placed generally over nut N and in association with a vacuum source (not shown), completing the air flow path through the apparatus thereby collecting powder which is not deposited on the internal threaded surfaces of the nut.

In operation the powder funnel 408 is provided with a source of resin type material powder to be applied to the nut N. The powder is entrained in the air stream or gaseous jet provided at the inlet 404 and is carried through the passageway 406, the exit port 410 and the conduit 412 to arrive at the spray applicator G. The air entrained powder is then directed onto a predetermined portion of the arcuate internal threaded surfaces of the nut N for application thereto. Any powder not applied to the nut N is directed out of the internal area of the nut N by the vacuum hood 420. The resin patch is applied to the nuts N in a more consistent, controllable and cost efficient manner.

Another form of the present invention will be described in relation to a particular type of fastener, namely a stud which includes a head portion, a shank portion and a plurality of projections depending downwardly from the head portion parallel to the central axis of the shank portion. However, it is to be understood that the present invention contemplates coating a variety of fasteners, including, but not limited to, screws, bolts, studs and similar externally threaded articles. Furthermore, it may be appreciated by those skilled in the art that the present invention may have advantages and may be used to provide a coating on a wide variety of internally threaded articles including, but not limited to, nuts, including deformed all-metal nuts, collars and the like.

The present method and described apparatus may also be used to apply a variety of coatings to fasteners. Such coatings include, but are not limited to, non-conductive coatings, masking coatings, insulating coatings, lubricating coatings, a combination of such coatings as well as similar types of coatings. Furthermore, such coating materials may include, but are not limited to, thermoplastic or thermosetting materials. Specifically, such coatings may include, but are not limited to nylon, acrylic, as well as fluorocarbon and polyethylene based materials. An example of such a material is manufactured by DuPont Corporation and is distributed under the trademark Teflon-P.

The coating material is preferably applied by spraying a powder onto the threaded fastener, however, a variety of application methods may be utilized. Such methods include gravity application, splatter application and the like.

Figure 19:
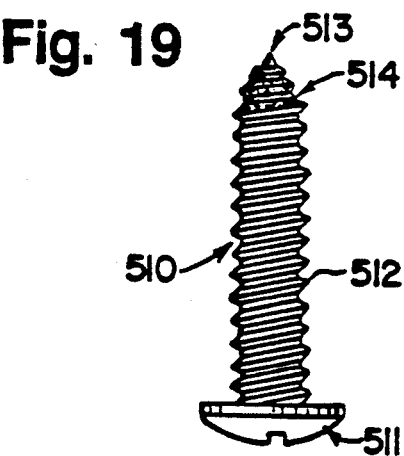
FIG. 19 is a front elevational view illustrating a self-threading screw of the present invention having coating material applied to the tip portion of the shank.

FIG. 19 depicts a screw 510 including a head 511, a shank 512, and the tip 513. Tip 513 is tapered to a point. The tip 513 is covered with a coating material 514.

As can be seen, at least one thread is coated with the lubricating, insulating or masking material. To coat more than one thread, however, may be uneconomical in certain applications. As a fastener is drilled or threaded, the coating material on the drive flank of the thread may be severed and scraped off by friction. The coating material assumes a granular form and may act to further lubricate either or both of the drilling and threading operations.

Figure 20:
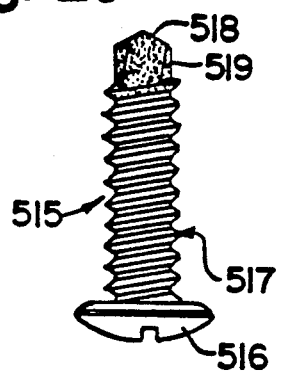
FIG. 20 is a front elevational view illustrating a self-drilling screw having coating material applied to the drill bit portion and first thread of the screw.

Another illustration of the invention as it relates to providing a fastener at least partially coated with a lubricating material appears in FIG. 20. A self-drilling screw 515 has a head 516, shank 517 and a tip 518. Tip 518 is configured like a drill bit. The lubricating material 519 coats the tip 518 and the first thread of shank 517. This has proved advantageous in reducing drive torque when fastener 515 is used to drill a hole and the same fastener is then subsequently threaded into the hole it first drills. Drive torque is reduced in both the drilling and threading operations.

Various tests have been carried out in developing the present invention. For example, a comparison was made under identical circumstances between screws with an applied teflon coating and those without. The first test involved #8-18×¾ inch long pan head self-drilling screws. For each screw tested, a ⅛ inch diameter starter hole was pre-drilled in low carbon steel 18 gauge sheet metal. A torque wrench was used to turn the fastener for five revolutions into the sheet metal. The maximum torque, in inch/lbs., was noted for each self-drilling screw. Twelve zinc-plated, self-drilling screws without teflon were used, as were twelve self-drilling screws that were coated completely from the tip of the drill point to half way up the thread length of the shank. The average reading for the screws without teflon was 34 percent higher, 17.6 in./lbs.

Similar results occurred when the same comparison was made with #6×1 inch long pan head self-tapping screws. 0.104 inch diameter starter holes were pre-drilled in the sheet metal. The twelve screws that were teflon coated for half of their thread length used an average of 20.6 in./lbs. as the maximum torque. The screws without teflon, but only their original dry phosphorous plating, showed a 16 percent increase in the maximum torque, to 23.9 in./lbs.

Figure 21:
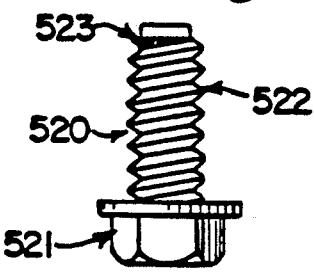
FIG. 21 is a front elevational view illustrating a bolt having coating material applied to the first thread.
Figure 22:
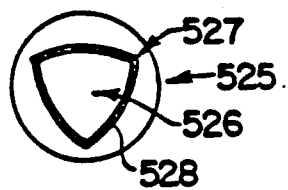
FIG. 22 is a top elevational view of a triobul bolt having coating material applied to the first thread.
Figure 23:
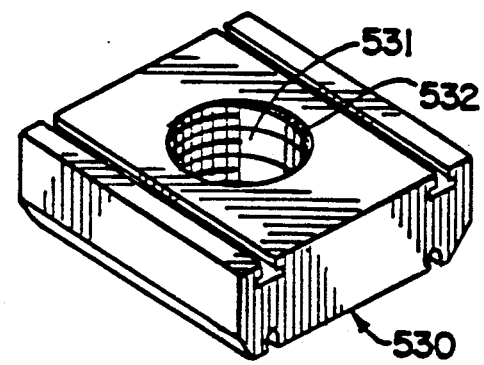
FIG. 23 is a full perspective view of a nut having one coated interior thread.

Besides a unitary piece, such as a screw, this invention also reduces drive torque in a nut and bolt combination. FIG. 21 depicts an ordinary hex-head bolt 520 which includes a head 521 and a shank 522. A first thread 523 of shank 522 is illustrated having a lubricating coating applied thereon. Other bolts can be treated in a similar manner. For example, FIG. 22 shows a sectional view of a trilocular bolt 525 that is used to ensure that a nut and bolt remained fastened. The shank 526 has three rounded lobes 527. The first thread of the shank is coated with a lubricating material 528. FIG. 23 presents an equally successful alternative to coating the threads of bolts. In particular, a nut 530 with threads 531 has its first thread coated with a lubricating material.

Application of a lubricating material is also effective in reducing drive torque when applied to bolts, in the form of weld studs, and nuts that are attached to, e.g., automobile parts that must be fastened together. An equally important embodiment of this invention is having the threads of the fasteners completely coated with a lubricating material, which then acts as a masking or insulating material in preventing the build-up of corrosion inhibitors which include Uniprime and the like.

Figure 24:
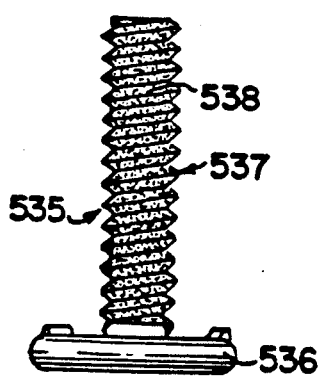
FIG. 24 is a front elevational view of threaded weld stud illustrating coating material applied to all of the threads.

For example, in FIG. 24 a threaded weld stud 534 is composed of a head 536 and a shank 537. The shank of the weld stud is entirely coated with a masking material 538. When the stud is welded to an automobile part that is later coated with a corrosion inhibiting material, the material does not adhere to the threads. Consequently, when that threaded stud is used in a fastening operation on an automobile assembly line, no difficulty is encountered in fastening, so production continues unimpeded.

Figure 25:
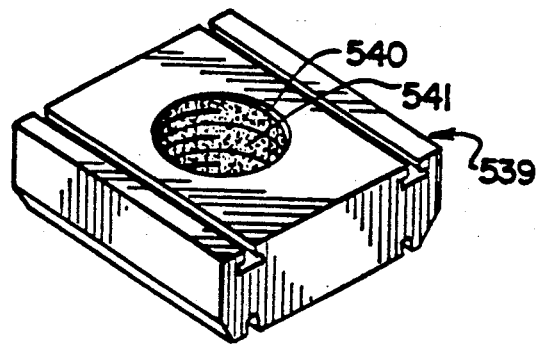
FIG. 25 a perspective view of a nut illustrating coating material applied to all threads.

FIG. 25 demonstrates the same principle as it applies to a nut, rather than a threaded weld stud. A nut 539 has its threads 540 completely coated with a masking material 541. When the nut is welded to an automobile and subsequently coated with corrosion inhibiting material, the amount of residual corrosion inhibitor which may remain does not impede the fastening process. The same masking technique can be used when a part simply has a threaded hole drilled through it, rather than having a fastener attached.

Figure 26:
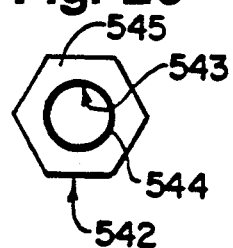
FIG. 26 is a top elevational view of a deformed all-metal nut having coating material applied to all threads.
Figure 27:
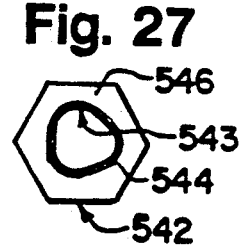
FIG. 27 is a bottom elevational view of the deformed all-metal nut of FIG. 26.

FIGS. 26 and 27 illustrate another embodiment of the present invention. A deformed all-metal nut 542 is shown which includes internal threads 543 which are completely coated with masking material 544. Deformed all-metal nut 542 also includes a top surface 545 depicted in FIG. 26 and a bottom surface 546 depicted in FIG. 27. As can be seen, bottom surface 546 includes a deformed thread, typically the outermost one or two threads of the nut. This type of coating is a great improvement over the cadmium wax coating previously used in that it eliminates the inherent dangers, including personal and environmental hazards, associated with using a radioactive coating.

The self-drilling screws with such a lubricating and/or masking material have also solved what previously had been a particularly vexing problem, particularly to the automobile industry. Fibrous material cannot be cut and aligned with the precision of machined parts. When an assembly line worker installs a piece of carpet on an interior door panel, there are no holes in the carpet. The carpet is aligned by hand and molding with pre-formed holes is held over the carpet. A self-drilling screw is placed through the hole in the molding and is then drilled through the carpet and threaded into the interior door panel. In the past, self-drilling screws would bind in the fibrous carpet. The lubricating and/or masking coating on the drill tip and/or at least a portion of the threads of the self-drilling fastener, substantially reduces and may prevent binding during installation. In addition, the coating material on the threads reduces the drive torque necessary to fasten the screw once it has pierced through the fibrous material and drilled into the door panel.

Figure 28:
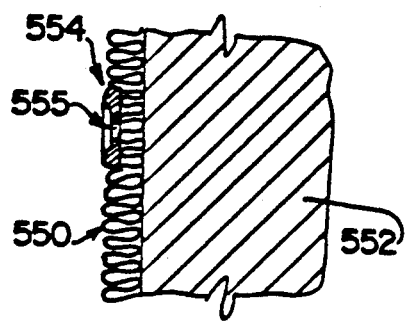
FIG. 28 is a cross-sectional view of carpet positioned between a door panel and interior door molding with a coated fastener threaded therethrough.
Figure 29:
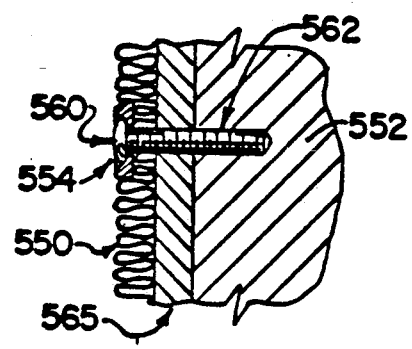
FIG. 29 is a cross-sectional view of carpet and sound insulation positioned between door molding and a door panel with a self-drilling screw threaded through all four items.

FIG. 28 depicts a sectional view of a self-drilling fastener installed through fibrous material such as carpet. Carpet 550 is placed against the interior side of a car door panel 552. Molding 554, with a performed hole 555, is placed against carpet 550. When carpet 550 and molding 554 are properly aligned during the assembly process, a coated self-drilling fastener is drilled through the carpet and threaded into the car door panel 552. FIG. 29 shows the completed process wherein the head 560 of a self-drilling fastener 562 sets in a recess of molding 554 and fastener 562 passes into door panel 552. In addition, FIG. 29 shows a layer of sound insulation 565 placed between carpet 550 and door panel 552. Thus, to accomplish the assembly depicted in FIG. 29, the self-drilling fastener must have passed through two consecutive layers of fibrous material.

Accordingly, improved coated fasteners or threaded articles and an improved method for using such articles is provided. The threaded articles include a resin type material applied to a predetermined area of the threads of a threaded article leading to improved performance characteristics, as well as improved patch definition. In particular, a Teflon patch can be applied to the threads of threaded articles achieving a substantially uniform covering of the threads providing a masking, lubricating and/or insulating covering enabling highly reliable torque tension tests to be performed on fasteners coupling corrosion treated structural members, such as are present in automobiles.

While the invention has been described with respect to preferred embodiments, it will be apparent to those skilled in the art that changes and modifications may be made without departing from the scope of the present invention in its broader aspects. Accordingly, it is intended that all matter contained in the above description, or shown in the accompanying drawing shall be interpreted in an illustrative and not in a limiting sense.

What is claimed is:

1. A threaded article having a coating on its thread, comprising:

a fastener having a threaded portion adapted for uniform engagement with a mating fastener;

a masking and insulating coating deposited on said fastener to form a substantially uniform layer covering at least a part of said threaded portion enabling the mating fastener to couple with said threaded article;

said fastener being heated, prior to the deposition of said coating, to a temperature sufficient to enable said coating to adhere to said threaded portion; and said threaded article being capable of exhibiting substantially uniform torque-tension curve behavior during engagement with said mating fastener, and said coating being substantially resistant to the deposition of corrosion resistant materials.

2. The threaded article of claim 1 wherein said masking and insulating coating is a masking, insulating and lubricating coating.

3. The threaded article of claim 1 wherein said masking and insulating coating comprises a fluorocarbon type coating.

4. The threaded article of claim 1 wherein said masking and insulating coating comprises a Teflon type coating.

5. The threaded article of claim 1 wherein said masking and insulating coating is at least about 20 microns to about 50 microns thick.

6. The threaded article of claim 1 wherein said threaded article comprises a nut.

7. The threaded article of claim 1 wherein said masking and insulating coating comprises a Teflon-P powder type coating.

8. The threaded article of claim 1 wherein said masking and insulating coating provides an insulating barrier for at least two seconds at about 500 to about 600 volts electrical potential applied across said uniform layer.

9. The threaded article of claim 1 wherein said threaded article comprises a stud.

10. The threaded article of claim 1 wherein said threaded article comprises an internally threaded well.

11. The threaded article of claim 1 wherein said threaded article comprises an internally threaded article.

12. The threaded article of claim 1 wherein said threaded article comprises an externally threaded article.

13. The threaded article of claim 1 wherein said threaded article comprises a deformed all-metal nut, said deformed all-metal nut having a top surface at one end defining a circular opening thereon, a bottom surface at a second end defining a deformed circular opening thereon, and a continuous thread between said top and bottom surfaces.

14. A fastener resistant to deposition of corrosion preventative material comprising:
a threaded portion adapted for uniform engagement with a mating fastener;
a TEFLON ® powder type coating deposited on said threaded portion to form a substantially uniform layer providing at least one of a masking, lubricating and insulating covering on said threaded portion of said fastener, said fastener being heated to a temperature sufficient to enable said TEFLON ® type powder to adhere to said threaded portion, prior to deposition of said TEFLON ® type coating;
said fastener being capable of exhibiting substantially uniform torque-tension curve behavior during coupling.

15. The fastener of claim 14 wherein said layer is at least about 20 microns to about 50 microns thick.

16. The fastener of claim 14 wherein said Teflon type coating consists essentially of Teflon-P material.

17. The fastener of claim 14 wherein said substantially uniform layer provides a lubricating and at least one of a masking and insulating covering on said threaded portion of said fastener.

18. A fastener resistant to deposition of corrosion preventative material comprising:
a threaded portion adapted for engagement with a mating fastener; and
a TEFLON ® powder type coating deposited on said threaded portion to form a substantially uniform layer, said uniform layer providing an insulating barrier for at least two seconds at about 500 to about 600 volts electrical potential applied across said uniform layer, said fastener being heated to a temperature sufficient to enable said TEFLON ® type powder to adhere to said threaded portion, prior to deposition of said Teflon ® type coating.

19. A threaded fastener comprising:
a heat at one end; and
a threaded shank associated with said head having a coated tip portion at the other end, at least a portion of said coated tip being coated with at least one of a lubricating material, an insulating material and a masking material, said coated tip portion being capable of reducing and preventing binding when installed through a fibrous material into an article, said fastener being heated to a temperature sufficient to enable said at least one of the lubricating material, insulating material and masking material to adhere to said portion of said coated tip, prior to deposition of said at least one of the lubricating material, insulating material and masking material.

20. The threaded fastener of claim 19 wherein said threaded fastener is a screw.

21. The threaded fastener of claim 19 wherein said threaded fastener is a bolt.

22. The threaded fastener of claim 20 wherein said screw is self-threading.

23. The threaded fastener of claim 19 wherein said fastener includes means for drilling at said tip portion and is self-drilling.

24. The threaded fastener of claim 23 wherein said means for drilling is substantially completely coated with at least one of said lubricating material, said insulating material and said masking material.

25. The threaded fastener of claim 23 wherein at least one of said lubricating material, said insulating material and said masking material is applied to the drill tip of said screw and to at least to a portion of one thread of said screw.

26. The threaded fastener of claim 19 wherein at least one thread is coated substantially 360° about said threaded shank with at least one of said lubricating material and said masking material.

27. The threaded fastener of claim 19 wherein said threaded shank is substantially completely coated with at least one of said lubricating material and said masking material.

28. A fastening system comprising:
a male segment having a substantially cylindrical threaded portion;
a female segment having a plurality of threads which interlock with the threaded portion of said male segment; and
at least one thread of at least one of said male and said female segment having a coating of at least one of a lubricating material, insulating material and masking material, said fastening system being capable of exhibiting substantially uniform torque-tension curve behavior during coupling, said fastener being heated, prior to the deposition of said coating, to a temperature sufficient to enable said coating to adhere to at least one thread of at least one of said male and said female segment.

29. The fastening system of claim 28 wherein all threads of at least one of said male segment and said female segment are substantially completely coated with at least one of said lubricating material, said insulating material and said masking material.

30. A threaded fastener comprising:

a top surface at one end defining a circular opening thereon;

a bottom surface at a second end defining a deformed circular opening thereon; and a continuous thread between said top and bottom surfaces, at least a portion of said thread coated with at least one of a masking, lubricating and insulating material, said fastener being capable of exhibiting uniform torque-tension curve behavior during coupling, said fastener being heated, prior to the deposition of said coating, to a temperature sufficient to enable said coating to adhere to said portion of said thread.

* * * * *

REEXAMINATION CERTIFICATE (2644th)
United States Patent [19]
Duffy et al.

[11] B1 5,221,170
[45] Certificate Issued  Aug. 1, 1995

[54] COATED THREADED FASTENERS

[75] Inventors: Richard J. Duffy, Utica; Joseph R. Dudley, Southfield; Gregory A. Fruehe, Kalamazoo; Max F. Dorflinger, Washington, all of Mich.

[73] Assignee: Nylok Fastener Corporation, Rochester, Mich.

Reexamination Request:
No. 90/003,628, Nov. 9, 1994

Reexamination Certificate for:
Patent No.: 5,221,170
Issued: Jun. 22, 1993
Appl. No.: 716,761
Filed: Jun. 18, 1991

Related U.S. Application Data

[63] Continuation of Ser. No. 281,633, Dec. 9, 1988, abandoned, which is a continuation-in-part of Ser. No. 907,582, Sep. 15, 1986, Pat. No. 4,775,555, and a continuation-in-part of Ser. No. 913,339, Sep. 30, 1986, Pat. No. 4,835,819.

[51] Int. Cl.[6] .............. F16B 25/00; F16B 37/00; B21D 53/20
[52] U.S. Cl. .............. 411/428; 411/387; 411/411; 411/903; 411/914; 470/2
[58] Field of Search .............. 411/411, 424, 428, 258, 411/301, 302, 386, 387, 902, 903, 914; 470/2

[56] References Cited

U.S. PATENT DOCUMENTS

| | | |
|---|---|---|
| 3,294,139 | 12/1966 | Preziosi . |
| 3,494,243 | 2/1970 | Kleinhenn . |
| 3,830,902 | 8/1974 | Barnes .............. 264/267 |
| 4,035,859 | 7/1977 | Newnom . |
| 4,114,564 | 9/1978 | Probst .............. 118/626 |
| 4,366,190 | 12/1982 | Rodden et al. .............. 427/183 |

*Primary Examiner*—Neill Wilson

[57] ABSTRACT

This invention relates to threaded fasteners, an apparatus for making such threaded fasteners and methods of fastening parts. The tip of the shank of a threaded fastener has at least one thread coated with a lubricating or masking material to reduce the drive torque necessary for fastening as well as provide a protective coating for the fastener during subsequent processing operations. The drill tip of the disclosed self-drilling fasteners is coated with a lubricating material to reduce drive torque and to eliminate binding when drilling through fibrous material. The present invention also prevents the build-up of corrosion inhibiting materials on threaded fasteners attached to parts to be fastened together. A masking and/or insulating material is first applied to the threaded fasteners attached to the parts to substantially prevent applied corrosion inhibitor from adhering to the threads of the fastener. A method of fastening parts, including fibrous material such as carpet or sound insulation, is also accomplished through practice of the present invention. The apparatus of the present invention provides a resin type stream entrained in a gaseous jet directed through a nozzle onto the threads of a fastener. The apparatus provides selectable thread coverage, including complete coverage of all threads.

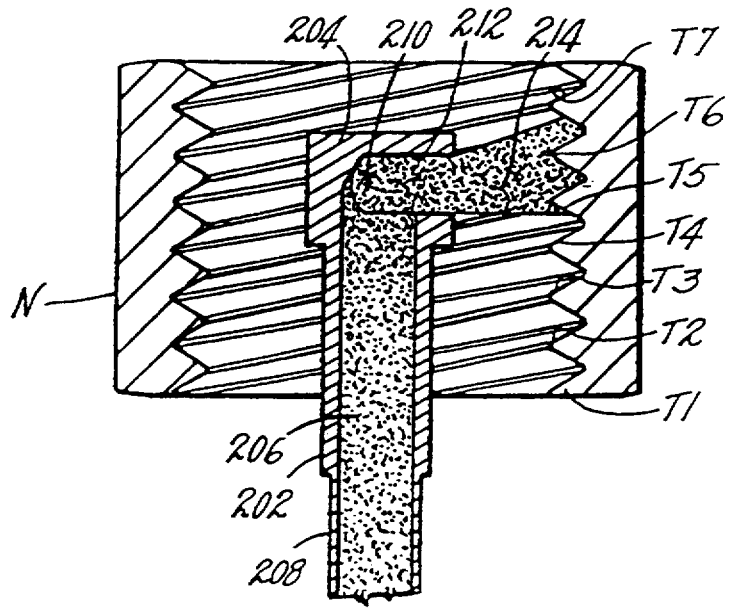

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 19–27 and 30 is confirmed.

Claims 3 and 17 are cancelled.

Claims 1, 14, 18 and 28 are determined to be patentable as amended.

Claims 2, 4–13, 15, 16 and 29, dependent on an amended claim, are determined to be patentable.

1. A threaded article having a *fluoropolymer* coating on its [thread] *threads*, comprising:
   a fastener having a threaded portion adapted for uniform engagement with a mating fastener;
   a *fluoropolymer* masking and insulating coating deposited on said fastener to form a substantially uniform layer covering [at least a part] *substantially all* of said threaded portion enabling the mating fastener to couple with said threaded article,
   said fastener being heated, prior to the deposition of said coating, to a temperature sufficient to enable [said coating] *a powdered form of said fluoropolymer* to adhere to said threaded portion; and
   said threaded article being capable of exhibiting substantially uniform torque-tension curve behavior during engagement with said mating fastener, and said coating being substantially resistant to the deposition of corrosion resistant materials.

14. A fastener resistant to deposition of corrosion preventative material comprising:
   a threaded portion adapted for uniform engagement with a mating fastener;
   a Teflon ® powder type coating deposited on *substantially all of* said threaded portion to form a substantially uniform layer providing [at least one of] a masking [, lubricating and insulating] covering on said threaded portion of said fastener, said fastener being heated to a temperature sufficient to enable said Teflon ® type powder to adhere to said threaded portion, prior to deposition of said Teflon ® type coating;
   said fastener being capable of exhibiting substantially uniform torque-tension curve behavior during coupling.

18. A fastener resistant to deposition of corrosion preventative material comprising:
   a threaded portion adapted for engagement with a mating fastener; and
   a Teflon ® powder type coating deposited on *substantially all of* said threaded portion to form a substantially uniform *masking* layer, said uniform *masking* layer providing an insulating barrier for at least two seconds at about 500 to about 600 volts electrical potential applied across said uniform layer, said fastener being heated to a temperature sufficient to enable said Teflon ® type powder to adhere to said threaded portion prior to deposition of said Teflon ® type coating.

28. A fastening system comprising:
   a male segment having a substantially cylindrical threaded portion;
   a female segment having a plurality of threads which interlock with the threaded portion of said male segment; and
   [at least one thread] *substantially all of the threads* of at least one of said male and said female [segment] *segments* having a coating of [at least one of] a [lubricating material, insulating material and] *powdered fluoropolymer* masking material, said fastening system being capable of exhibiting substantially uniform torque-tension curve behavior during coupling, said fastener *system* being heated, prior to the deposition of said coating, to a temperature sufficient to enable said [coating] *powdered fluoropolymer* to adhere to [at least one thread] *said threads* of at least one of said male and said female segment.

* * * * *